US011819768B2

(12) United States Patent
Orlow

(10) Patent No.: US 11,819,768 B2
(45) Date of Patent: *Nov. 21, 2023

(54) PLATFORM GENERATING GAMES OF SKILL AND CHANCE

(71) Applicant: Vetnos LLC, New York, NY (US)

(72) Inventor: Daniel K. Orlow, New York, NY (US)

(73) Assignee: Vetnos LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,637

(22) Filed: Sep. 2, 2022

(65) Prior Publication Data

US 2023/0001287 A1 Jan. 5, 2023

Related U.S. Application Data

(63) Continuation of application No. 17/563,807, filed on Dec. 28, 2021, now Pat. No. 11,433,295, which is a (Continued)

(51) Int. Cl.
*A63F 9/24* (2006.01)
*A63F 11/00* (2006.01)
(Continued)

(52) U.S. Cl.
CPC ........... *A63F 3/0645* (2013.01); *G06N 20/00* (2019.01); *G06Q 50/34* (2013.01);
(Continued)

(58) Field of Classification Search
CPC ... G07F 17/32; G07F 17/3201; G07F 17/3214
(Continued)

(56) References Cited

U.S. PATENT DOCUMENTS

| 7,481,707 | B1 | 1/2009 | Luciano, Jr. et al. |
| 7,614,944 | B1 | 11/2009 | Hughes et al. |
| 8,538,563 | B1 | 9/2013 | Barber |
| 2005/0233798 | A1 | 10/2005 | Van Asdale |
| 2008/0102946 | A1 | 5/2008 | Amour |
| 2009/0023495 | A1 | 1/2009 | Koustas et al. |
| 2009/0176560 | A1 | 7/2009 | Herrmann et al. |

(Continued)

FOREIGN PATENT DOCUMENTS

AU 2013242817 A1 4/2014

*Primary Examiner* — Adetokunbo O Torimiro
(74) *Attorney, Agent, or Firm* — Sunstein LLP

(57) ABSTRACT

A system is disclosed for providing array-based games reflecting the performance of participants in sporting events. The array-based games include skill-based games and event bingo games. The skill based games depend on selecting prospective winners that match actual winners based on real events. The event bingo games provide bingo cards with randomized numbers associated with each position on the card. Winning cards are the first cards that match the randomized numbers with another set of randomized numbers to form a game ending patterns of matches. The system includes at least one server having a processor configured to execute machine-readable code. The processor is configured to cause the server to create and provide a set of array-based games to the plurality of presentation devices of the users, which each present the set of games on a respective display, each game of the set having an assigned fixed odds payout. The server receives, over the wide area network, data from the presentation devices of the users. The server updates the event data pertinent to participants in the actual events associated with the array-based games. The server uses the updated data to calculate and assign payoffs to the users based on the fixed payoff odds.

25 Claims, 35 Drawing Sheets

Related U.S. Application Data continuation of application No. 17/367,249, filed on Jul. 2, 2021, now Pat. No. 11,207,588.

(51) Int. Cl.
| | | |
|---|---|---|
| *G06F 13/00* | (2006.01) | |
| *G06F 17/00* | (2019.01) | |
| *A63F 3/06* | (2006.01) | |
| *G07F 17/32* | (2006.01) | |
| *G06N 20/00* | (2019.01) | |
| *G06Q 50/34* | (2012.01) | |

(52) U.S. Cl.
CPC ...... *G07F 17/3211* (2013.01); *G07F 17/3227* (2013.01); *G07F 17/3237* (2013.01); *G07F 17/3244* (2013.01); *G07F 17/3288* (2013.01)

(58) Field of Classification Search
USPC ................ 463/1, 12, 15, 20, 22, 25, 30
See application file for complete search history.

(56) References Cited

U.S. PATENT DOCUMENTS

| | | |
|---|---|---|
| 2010/0093431 A1 | 4/2010 | Kasiotakis |
| 2011/0014974 A1 | 1/2011 | Torf |
| 2012/0115585 A1 | 5/2012 | Goldman et al. |
| 2013/0178259 A1 | 7/2013 | Strause et al. |
| 2013/0178270 A1 | 7/2013 | Flaherty et al. |
| 2014/0031105 A1 | 1/2014 | Givant |
| 2014/0167355 A1 | 6/2014 | King |
| 2014/0309001 A1 | 10/2014 | Root |
| 2014/0342817 A1 | 11/2014 | Marantelli |
| 2016/0210815 A1 | 7/2016 | Holt et al. |

Multiple Game Types

*Array selected from risk inventory based on predicted preferences of customer*

- Computer builds array from risk inventory and selects "winner"
- Computer builds array from risk inventory and customer selects "winner"
- Customer builds array from risk inventory and selects "winner"

*Array selected from randomly generated risk inventory*

- Computer builds array from risk inventory and selects "winner" (slots)
- Computer builds array from risk inventory and customer selects "winner" (keno)
- Customer builds array from risk inventory and computer selects "winner"
- Customer builds array from risk inventory and selects "winner"

In order of predicted success, sequentially assign selections
From rows 1, 2 and 3 below into expected first, second and third place performance relative to their predicted performance against other two choices in row 1, 2 or 3.

Customer selects which player or team will have best risk adjusted prediction of performance based on fantasy or performance scoring, or of total points scored for team Sqorr Example:

1. Choose Matchup, Over Under or Toggle Row 1
2. Choose Matchup, OverUnder, or Toggle Row 2
3. Choose Matchup, OverUnder, or Toggle Row 3
4. Ranks selections in order of which has highest marginal score,
i.e. which will beat their own projected score by the most, in order of highest (1), next (2) lowest (3)

Prize Payouts

Fixed:
Win on all three matchups and rank them all correctly returns 25-1.

Fixed Progressive:
Win on all three matchups and rank them all correctly returns 15-1.
Win on all three matchups but only rank one of three correctly returns 3-1.
Win on all three matchups but rank none correctly is a Free Play.

*Fig. 27*

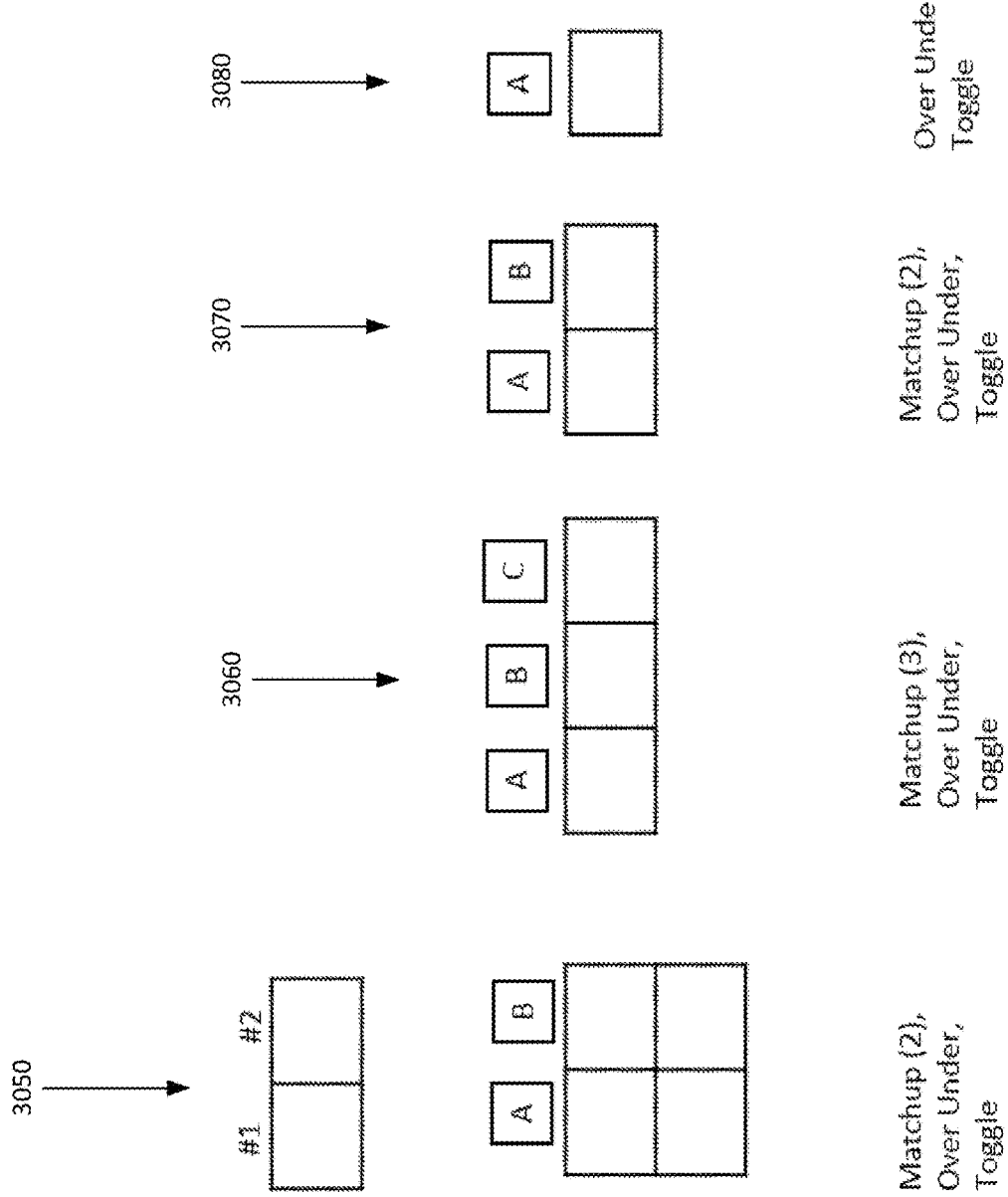

|  | Buyer | | |
|---|---|---|---|
|  |  | 0 | 1 |
| Seller | 0 | 0,0 (Bid) | 0,1 |
|  | 1 | 1,0 | 1,1 (Ask) |

Fig. 31A

|       | Seller |     |     |     |
|-------|--------|-----|-----|-----|
|       |        | 1   | .5  | 0   |
| Buyer | 1      | 1,1 | 1,5 | 1,0 |
|       | .5     | .5,1| .5,.5| .5,0|
|       | 0      | 0,1 | 0,.5| 0,0 |

I. Ranking Athletes

| #1 | #2 | #3 | #4 |
|----|----|----|----|
| A  | B  | C  | D  |

24 permutations
N=4

Fig. 32A

II. Over Under

III. Matchup

|   | Team 1 | | Team 2 | |
|---|---|---|---|---|
| 1 | A | B | C | D |
| 2 | A | C | B | D |
| 3 | A | D | B | C |

Rewards:
A rewards may or may not equal B rewards

| | | |
|---|---|---|
| Fixed | A | B |
| Fixed progressive | A | B |
| Dynamic fixed | A | B |
| Dynamic fixed progressive | A | B |

Fig. 33

PLATFORM GENERATING GAMES OF SKILL AND CHANCE

PRIORITY

The present patent application is a continuation of U.S. patent application Ser. No. 17/563,807, filed Dec. 28, 2021, to be issued as U.S. Pat. No. 11,433,295, which is a continuation of U.S. patent application Ser. No. 17/367,249, filed Jul. 2, 2021, now issued as U.S. Pat. No. 11,207,588, which are both hereby incorporated herein, in their entirety, by reference.

TECHNICAL FIELD

The present invention relates to computer-implemented gaming activities that incorporate games of skill and chance. Aspects of the invention relate to computer-implemented gaming systems that meet the requirements for class II gaming under 25 C.F.R. § 547.

BACKGROUND ART

Sports wagering is popular because it increases fan interest and excitement in sporting events. Sports wagering both land-based and internet-based have been established to offer such services and depend on jurisdictional laws.

Sports wagering, however, is not legal in many locations. As a result, other types of activities have been created to increase fan interest and excitement associated with sporting events. As one example, fantasy sports have been created. These activities correlate the performance of players or sets of players involved in actual sports events to a non-wagering entertainment activity.

Skill-based games that allow a player to participate with real money purchases with resulting prizes based on the fan's skill have become popular. Such games allow a fan to engage in a skill where they compete and play against other users. Examples of such skill-based games include games such as, poker and fantasy sports leagues (e.g. baseball, football etc.).

Traditional fantasy sports typically require a significant time commitment and may be difficult for a fan to play casually or quickly. Similarly, legacy sports betting is a standardized model based on money-line spreads, with betting lines on single events or multiple events in combinations and at various prices for various risk level. Consequently, from the perspective of an operator, it may be difficult to attract casual sports fans with traditional fantasy sports.

Class II games under 25 C.F.R. § 547 provide popular Native American gaming activities. Predominant in this category are games based on bingo cards, i.e. a random number output in an array format. Integrating fantasy sports scoring into class II bingo games ensures a high degree of randomness and may provide added excitement for sport's fan gaming enthusiasts.

It is thus desirable to develop new type activities in a fast-paced sports and event based gaming environment, including skill-based activities as well as activities that satisfy the technical requirements for class II games under 25 C.F.R. § 547.

A requirement for successful implementation of such activities is a risk-management based platform of services configured to serve games of skill and chance to customers, and to produce, manufacture, distribute and monitor based on unit risk and liquidity.

SUMMARY OF THE EMBODIMENTS

In accordance with embodiments of the invention, there is provided a non-transitory storage medium storing instructions that, when executed by an activity server system, establish computer processes. In this embodiment, the activity server system communicates over a wide area network with a plurality of presentation computing devices, each distinct one of the presentation devices associated with a distinct one of a plurality of users. Also in this embodiment the computer processes include:

separately responsive to prompting by the activity server system, receiving from each of the presentation devices user profile data including user validation information;

validating the profile data to determine user eligibility to play a proffered event bingo game;

serving, to each validated presentation device of each eligible user, a corresponding game card having a plurality of risk units selected from a risk inventory, each risk unit having at least two potential winning outcome and an association with a position on the game card;

determining a set of reward winning patterns;

estimating a volume of game card sales;

determining a fixed odds payout for each of the set of reward winning patterns based on the estimated volume of game card sales;

for each risk unit, choosing, from the at least two potential winning outcomes therein, a projected winner;

for each risk unit, determining, based on an outcome of a set of actual events, which potential winner is an actual winner based on the correct event selection;

for bingo games daubing all positions for each game card for which actual winners match projected winners;

for bingo games determining if each game card has at least one reward winning pattern based on daubed positions, and identifying a user having such game card;

dispensing the fixed odds payout to the user having the reward winning pattern.

In a further related embodiment determining the fixed odds payout includes determining the fixed odds payout based on a desired discount to theoretical value. To discount the theoretical value the platform may take the chance of a reward being won, and then the amount of a fixed odds reward as a payout to determine the projected payouts. The fixed odds may then be discounted to allow for a theoretical profit to be obtained. Since meeting the theoretical profit becomes higher as more money enters the pool, the platform may be able to offer higher odds payouts if more money is bet. Optionally, determining the fixed odds payout based on the desired margin includes determining the desired margin based on the estimated volume of game card sales. Also optionally, determining the fixed odds payout includes determining the fixed odds payout separately for each presentation device. Also optionally, determining the fixed odds payout separately for each presentation device further includes determining the fixed odds payout separately for each such presentation device based on a history of success of such presentation device. Also optionally, serving the corresponding game card further includes configuring the corresponding game card for playing a skill-based game. Also optionally, serving the corresponding game card further includes configuring the corresponding game card for playing a chance-based game. Also optionally, the computer processes further comprise determining a venue associated with each of the presentation devices and wherein configuring the corresponding game-card for playing the skill-based game further includes determining if the venue of each respective presentation device so permits and otherwise prohibiting playing the skill-based game. Also optionally, the computer processes further comprise determining a venue associated with each of the presentation devices and wherein configuring the corresponding game-card for playing the chance-based game further includes determining if the venue of each respective presentation device so permits and otherwise prohibiting playing the chance-based game. Also optionally, determining if each game card has at least one reward winning pattern further includes determining if the game card has a correct ranking, based on a marginal score, of the risk units. Also optionally, determining if each game card has at least one reward winning pattern further includes determining if a participant of each risk unit is qualified. Also optionally, determining the fixed odds payouts for each of the reward winning patterns includes calculating the fixed odds payouts based on a size of a sphere of outcomes so as to reduce a probability of a non-negative return.

In accordance with another embodiment of the invention, there is provided a non-transitory storage medium storing instructions that, when executed by an activity server system, establish computer processes. In this embodiment, the activity server system communicates over a wide area network with a plurality of presentation computing devices, each distinct one of the presentation devices associated with a distinct one of a plurality of users. Also in this embodiment the computer processes include:

separately assigning, from a risk inventory, a risk unit, comprising at least two potential winners, to a position of each bingo card;

for each bingo card, assigning each potential winner of each risk unit a pool of numbers;

for each bingo card, selecting randomly, from the pool of numbers assigned to each potential winner a corresponding number;

for each risk unit, choosing, from the at least two potential winners in the risk unit, a projected winner, and assigning the corresponding number for the projected winner to the risk unit's assigned position;

for each risk unit, determining, based on an outcome of a set of actual events, which potential winner is an actual winner, assigning each risk unit on the bingo card the actual winner for such risk unit and a winning number, wherein the winning number is the corresponding number assigned to the actual winner;

marking all positions for each bingo card for which actual winners match projected winners;

selecting a game ending pattern for the bingo cards;

for each position on the bingo cards, assigning a second number chosen randomly from a pool of numbers including the winning number for the position;

daubing each marked position on the bingo cards for which the assigned winning number matches the second number;

selecting the bingo card having a game ending pattern of daubed positions as a winning bingo card, and identifying a user having the winning bingo card;

dispensing a reward to the user having the winning bingo card;

dispensing a fixed odds reward to the user having a bingo card having a reward winning pattern.

In a further related embodiment assigning each potential winner of each risk unit the pool of numbers includes, for each bingo card, assigning each potential winner a distinct pool of numbers. Optionally, the computer processes further include generating the risk inventory based on algorithmic processes. Also optionally, generating the risk inventory includes using machine learning. Also optionally, assigning, from the risk inventory, the risk unit includes assigned the risk unit based on random selection. Also optionally, the array of positions is a two-dimensional array. Also optionally, the array of positions is mapped onto a three-dimensional surface. Also optionally, the array is a 3×3 matrix. Also optionally, selecting the bingo card having a game ending pattern further includes selecting the bingo card having daubed selections on two contiguous squares. Also optionally, selecting the bingo card having a game ending pattern further includes selecting the bingo card having a pattern of three daubed selections in a row, selected from the group consisting of horizontal, vertical, and diagonal. Also optionally, serving the corresponding bingo card having an array of positions includes displaying the bingo card to the user as a slot machine interface and wherein the computer processes further comprise initiating the event bingo game by a user interaction with the slot machine interface. Also optionally, assigning a second number chosen randomly from a pool of numbers is done repeatedly such that for each bingo card each marked position is a daubed position, wherein the reward to the user having the winning bingo card is the fixed odds reward.

BRIEF DESCRIPTION OF THE DRAWINGS

The foregoing features of embodiments will be more readily understood by reference to the following detailed description, taken with reference to the accompanying drawings, in which:

FIG. 6 summarizes multiple embodiments of array-based games, based on how arrays are constructed and how choices are made for the arrays.

FIG. 12 embodies array-based games for which the computer randomly generates a risk inventory of events, the customer builds an array from the risk inventory, and the computer randomly selects potential winners.

FIG. 13 embodies array-based games for which the computer randomly generates a risk inventory of events, the customer builds an array from the risk inventory, and the customer selects potential winners.

FIG. 21 shows, by means of a specific example, the process of building a micro bingo card according to an embodiment of the instant invention. Risk units are selected randomly or algorithmically by the computer and displayed on a 3×3 bingo card. First integers are randomly selected from pools, and are overlaid with computer-selected risk units, so that each potential winner is associated with a first integer.

FIG. 27 embodies a game where the user selects a projected winner from a risk unit and ranks the projected winners in the order of highest to lowest marginal score.

FIGS. 30A-H embody games having a varied number of risk units, potential winners, and rank selections.

FIGS. 31A-C embody how the platform bases odds off of a prisoner's dilemma problem.

FIGS. 32A-E embody games where each potential winner may include more than one participant.

FIG. 33 embodies a game where rewards change based on selection of a potential winner.

DETAILED DESCRIPTION OF SPECIFIC EMBODIMENTS

Figure 1:
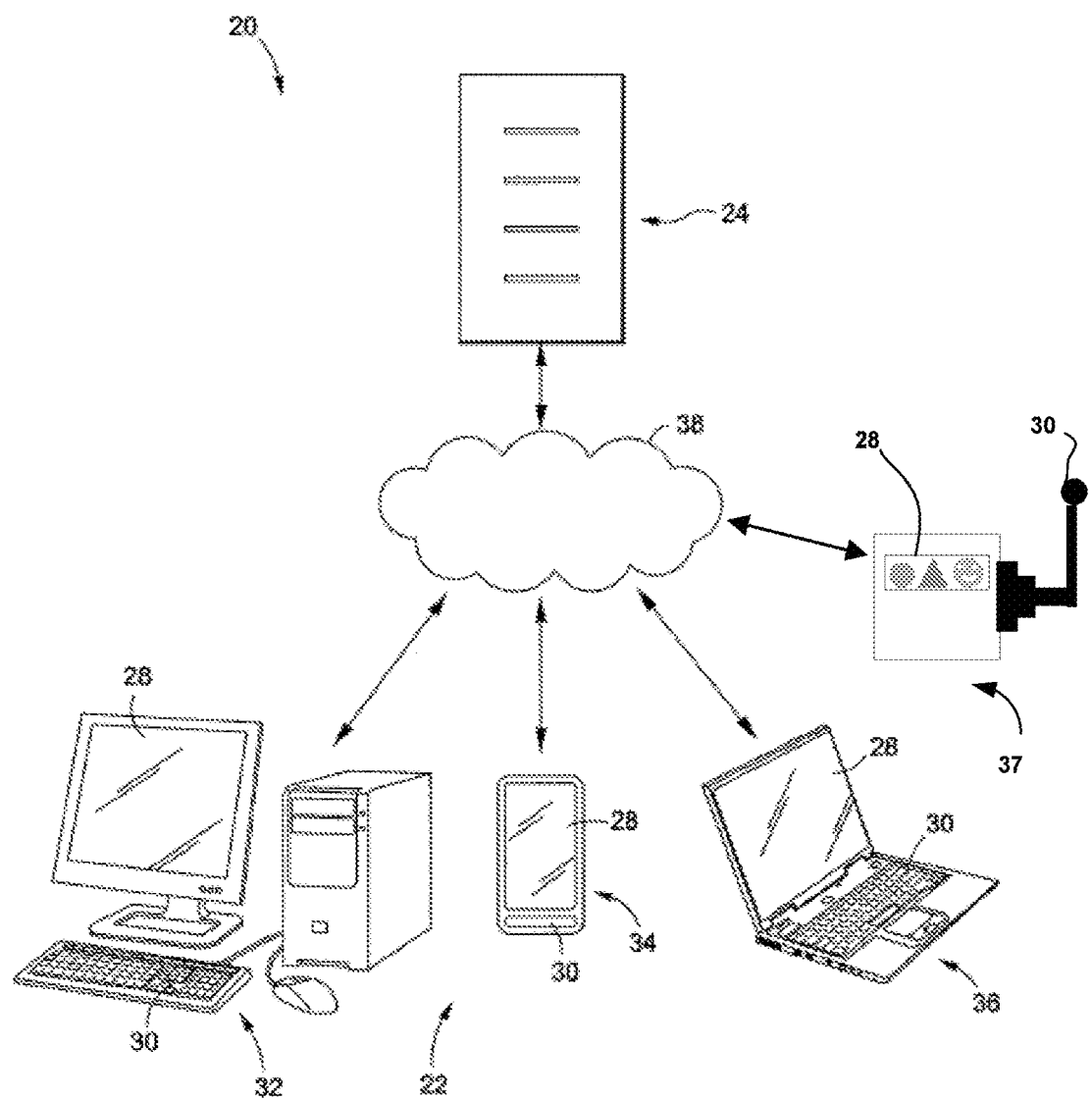
FIG. 1 is a computing environment for implementing embodiments of the present invention.

Definitions. As used in this description and the accompanying claims, the following terms shall have the meanings indicated, unless the context otherwise requires:

A "set" is a grouping that includes at least one member.

A "skill-based game" shall mean a game that allows a user to use a skill such as the selection of participants based upon statistics and personal knowledge prior to occurrence of a set of events, such as sporting events, wherein, for the skill-based game, a determination will be made based upon a set of preexisting scoring rules for scoring the one or more of the participants based upon actual performance in the set of events. As used herein, a "skill-based game" shall be understood to operate in a manner as to be exempt from sports betting regulation under provisions of the Unlawful Internet Gambling Enforcement Act of 2006 (UIGEA), 31 U.S.C. §§ 5361-5366, as a "fantasy or simulation sports game or educational game or contest in which (if the game or contest involves a team or teams) no fantasy or simulation sports team is based on the current membership of an actual team that is a member of an amateur or professional sports organization (as those terms are defined in section 3701 of title 28)" and that additionally meet the enumerated criteria of 31 U.S.C. § 5362(1)(E)(ix). Specifically, (I) All rewards offered to winning participants are established and made known to the participants in advance of the game or contest and their value is not determined by the number of participants or the amount of any fees paid by those participants. (II) All winning outcomes reflect the relative knowledge and skill of the participants and are determined predominantly by accumulated statistical results of the performance of individuals (athletes in the case of sports events) in multiple real-world sporting or other events. (III) No winning outcome is based—(aa) on the score, point-spread, or any performance or performances of any single real-world team or any combination of such teams; or (bb) solely on any single performance of an individual athlete in any single real-world sporting or other event. Further these are read in accordance and to be congruent with a broad range of state law tests.

"Bingo" is defined herein by 25 C.F.R. 547.3, which in part requires that players: (1) play for prizes with sheets (herein also referred to as cards) bearing randomly generated numbers; (2) mark numbers or designations when events, are determined, 3) daub positions based on event selection (an event being a ball drop or other event); and (4) end the game by being the first person to cover a "game-ending pattern" on such cards based on a "ball drop" producing a random number that matches a random number already present on a sheet (or here a card)

An "event bingo" game is a bingo game the outcome of which (the "ball drop") is determined by the association of actual event outcomes with randomly selected numbers. According to embodiments described in this disclosure, events are associated with positions on an array, and randomly selected first and second numbers are assigned to each position of each risk unit, in part based on the outcome of actual events. Any array choice game can be used to construct an "event bingo" game.

A "user" means an individual playing a skill based game or an event bingo game.

A "participant" refers to an item, for example, a "player," such as an "athlete" or a "team" within an event (e.g. sporting event such as professional football or other event etc.), on which a skill-based game is based. In horse-racing a "participant" can be a horse, a jockey, or a trainer.

A "risk unit" is a choice of "potential winners" offered to the user. Examples of risk units are: an over-under, a matchup, a toggle, and other types of single choice game offerings.

A "projected winner" is a single potential winner chosen from a risk unit. The projected winner can be chosen by means selected from the group consisting of: a user selection, a random computer process, and a non-random computer process.

A "winning selection" is a projected winner later determined to be an "actual winner."

An "actual winner" is determined for each risk unit based on the results of one or more actual events. The "actual winner" of a matchup or toggle is determined as the participant in a risk unit having the highest score.

A participant's "score" is based on performance in actual events, and may be expressed in terms of a variety of player statistics (e.g. points scored, assists, runs batted in) or may be an aggregate statistical determination of player performance (e.g. fantasy points).

A "matchup" is a risk unit that presents to the user a first participant and a second participant from which a projected winner is chosen from the two participants. If the projected winner matches the actual winner, then the risk unit is said to be "correctly matched."

A "matchup N" is a risk unit that presents to the user N participants from which a projected winner is chosen from the N participants. If the projected winner matches the actual winner, then the risk unit is said to be "correctly matched."

An "over-under" is a game in which the user is presented a predicted score for a participant in an event and selects whether the actual score will be over or under the predicted score. For an "over-under" the "projected winner" is a skill-based or random selection of over or under. If the projected winner matches the actual winner, then the risk unit is said to be "correctly matched."

A "toggle" is a risk unit that presents to the user a first participant and a choice from a plurality of second participants to pair against the first participant in a matchup. If the projected winner matches the actual winner, then the risk unit is said to be "correctly matched."

For a matchup or toggle, a "marginal score" is the difference in score between the first participant and the second participant. For an over-under the "marginal score" is the difference between an actual score and a predicted score. For a match-up having a point spread, the marginal score is the difference between the actual score and the point spread.

An "advanced choice game" is a game with one or more risk units, each game being assigned a fixed odds payout based on winning user selections within the game.

A "ranking game" is an advanced choice game comprising multiple selections, wherein the selections are further ranked based on marginal score, in the order of highest to lowest.

An "array" is an arrangement of objects in two dimensions or on the surface of a three dimensional object. It can be calculated as a single object, which in a three dimensional application is the same as a cube or die.

For an event bingo game, a "bingo card" is synonymous with an "array."

A "position" is a location and geometric representation of an object in an array. For traditional bingo, the "position" is represented as a "square." However, in other array based games, including event bingo, a "position" may be represented by another type of geometric object such as a triangle, pentagon, or hexagon.

A "game-ending pattern" for a bingo card associated with an event bingo game is a predetermined pattern of matched first and second random numbers on a bingo card.

A "winning bingo card" is the first bingo card to obtain a game ending pattern of matching first and second random numbers.

An "array choice" is a game that includes an array of positions, each position associated with an element, each element being selected from the group consisting of a matchup, a toggle, and an over-under, wherein, for each element, the user makes a selection of a predicted outcome associated with the element. In order for a user to win, the actual outcome must match the predicted outcome for each of a specified pattern of elements in the array, such as neighboring pairs, a row, a column, or a diagonal.

An "array choice-plus-ranking" is an array choice game in which, besides selecting a predicted outcome for each element of an array, the user additionally ranks the selected predicted outcome in relation to the outcomes of other elements in the array.

A "category choice" is a game that includes multiple categories of matchups and the user selects a set of participants from each matchup category.

A "two-dimensional array" is an array presenting positions as a two-dimensional arrangement. For array based games, each position is associated with a risk unit. The presented arrangement of positions defines the contiguity of neighboring positions for the purpose of determining a "game-ending pattern."

A "three-dimensional array" is an array presenting positions on the surface of a three-dimensional object. For array based games, each position is associated with a risk unit. The presented arrangement of positions defines the contiguity of neighboring positions which may determine a game-ending pattern or a reward winning pattern.

"Tic-tac-toe" is an array choice game for which each square of a 3×3 array provides a risk unit, and for which winning requires three-in-a-row winning choices.

"X's and O's" is a variant of the tic-tac-toe game for which the tic-tac-toe board is rotated for presentation as a diamond.

"Micro Bingo" is an event bingo game for which each square of a 3×3 array is associated with randomly selected numbers associated with risk unit selections, whereby the game ending pattern ends the game. In various embodiments a prize ending or reward winning pattern may be produced by also using a random number generator to identify and match correctly selected events qualifying for awards to the previously produced random number generator such that for event based bingo, a reward winning pattern can be randomly or previously established matching correctly selected events to produce a game ending pattern. In various embodiments the interim, continuation, consolation or bonus prizes are then awarded based on the sequence of correctly selected events.

An "operator" means a person or group that operates the system for presenting the skill-based game to a user. In certain contexts, the operator refers to a person or group of people that are skilled at determining matchups of players of equal sport skill that will likely produce similar fantasy points during a given game and scores of players that will likely be produced during a given game. The operator may receive matchup, over-under, and score suggestions from a suggestion engine and may use a matchup/score tool for making the final assigned matchups/scores. The operator of the system for presenting the skill-based game to the user, manages the activity management server, the platform and the distributed computer application for playing the skill-based game.

A "fixed odds payout" is a fixed amount of a reward assigned and presented to a given user based upon the given user's purchase amount paid and selections made in an advanced choice game, and not altered based upon the participation and selections of other users. There are four types of a fixed odds payout, each separately defined herein: a simple fixed odds payout, a fixed odds progressive payout, a dynamic fixed odds payout, and a dynamic fixed odds progressive payout.

A "simple fixed odds payout" is a fixed amount reward assigned to a given user based upon the given user's purchase amount paid and selections made in an advanced choice game, and not altered based upon the participation and selections of other users nor subject to variation in level based on a series of winning occurrences or on dynamic conditions.

A "fixed odds progressive payout" is a fixed odds payout having graduated levels based on a series of winning occurrences in the advanced choice game.

A "dynamic fixed odds payout" is a dynamically priced fixed amount reward assigned to a given user based upon the given user's purchase amount paid and selections made in an advanced choice game, and not altered based upon the participation and selections of other users, the fixed amount being dynamically priced using a technique selected from the group consisting of artificial intelligence (AI), machine learning, other algorithmic data analysis of reward, risk, volume, and total risk, and combinations thereof.

A "dynamic fixed odds progressive payout" is a dynamic fixed odds payout having graduated levels based on a series of winning occurrences in the advanced choice game.

A "risk inventory" is a set of risk units.

A "reward" is a benefit conferred upon an individual for service, effort, or achievement, such benefit including, among other things, any of a prize, a payout, and an award, and may be denominated in a form selected from the group consisting of cash, a nominal prize, a token, a currency that is, among other things, promotional, social, cryptographic, or convertible, and combinations thereof.

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "computer interface" is a physical or virtual embodiment that is presented to a user, allowing the user to provide instructions to control underlying computer processes.

A "slot machine" is a physical device or a virtual embodiment of a physical device that provides a computer interface that allows a user to initiate an event bingo game, signal whether or not the user is a winner of the event bingo game, and notify and/or delivers the winner a reward.

A "reward winning pattern" is a selection of actual winners meeting criteria established for receiving a fixed odds payout.

A participant is "qualified" if the participant has achieved a predetermined performance threshold in order to receive fantasy points, e.g. scoring a touching, making the 8 seconds, winning an award, etc.

A "game card" is a bingo card or other card having a game presenting a set of risk units to the user in any configuration. A game card may comprise a ranking game, bingo game, advanced choice game, or other games including games not discussed.

To "mark" a position on a game card is to indicate the position has a winning selection.

A "daub" is an indication that a position has matched a ball drop.

"Profile data" of a user is a collection of data indicative of the user, which may include data selected from the group consisting of: user validation data, user location data, user history of success, other information about the user, and combinations thereof.

Embodiments of the present invention are related to U.S. patent Ser. No. 14/847,795, filed on Sep. 8, 2015, which is published as U.S. Patent Application Publication No. 2016/0071355 and now issued at U.S. Pat. No. 10,353,543, and which is incorporated herein, in its entirety, by reference.

TECHNICAL IMPLEMENTATION

Embodiments of the present invention include methods and systems for presenting to users pure skill-based games (e.g. array and ranking games) and array-based games of chance (e.g. event bingo games). The embodiments present the games on fixed odds payout using a parlay structure in an array set $\{A_{n,x}\}$ including performance based scoring ("fantasy/projected performance") of sport and other data enabled performance activities. The array-based games may relate to sports activities or other entertainment-based activities, to elections, or to other events for fixed odds payout. In some embodiments, the array-based games are available for all sports, including all North American stick and ball (professional leagues, NCAA, tennis golf etc.), NASCAR (and formula 1), soccer (futbol), cricket, rugby, bass fishing, rodeo events, horse racing, etc. Some embodiments uniquely provide array-based components for horse-racing in which each component is based on performance of a horse, a jockey, a cowboy, livestock, or a trainer for fixed odds payout. In some embodiments, the activities relate to fantasy-sports type activities. Some embodiments allow multiple participants to be formed into a single game with a single reward format that is consistent despite the participants being from different sports, sports events, or other events.

FIG. 1 is a block diagram of an exemplary computing environment 20 for implementing embodiments of the present invention. The computing environment 20 includes an activity management server 24 communicatively coupled to presentation devices 22 that present, via applications executed on the presentation devices 22, game activities of skill and chance to corresponding users. The applications include user interfaces that present visual aspects of the game activities to the users.

In the environment of FIG. 1, the presentation device 22 is communicatively coupled, via a computer network 38, to the activity management server 24. The computer network 38 may be the Internet, a cellular network, a satellite communication network, or any other networks or communication systems or devices known in the art. In some embodiments, the communication link through the network 38 is a dedicated link, such as a dedicated wired link between the presentation device 22 and activity management server 24. In some embodiments, the communication link through the network 38 includes one or more local area network, wide area network, or any other networks linked together to form the computer network 38. The network 38 may include a public network, a private network, and combinations thereof. Communication over the network 38 may use different communication channels, such as secure and unsecure channels.

Each presentation device 22 includes a video display 28 configured to display game activities, and an input device 30 configured to receive input related to the game activities. Each presentation device 22 further includes a communication interface configured to communicate, via network 38, with the activity management server 24. Each presentation device 22 also includes a main processor for executing program instructions, memory for storing data such as program instructions, a video processor, an audio processor, other processors, input and output ports, etc. In some embodiments, a presentation device 22 is configured within a game console, smart television, kiosks, gaming tables, gaming tablets or other such device. In some embodiments, the presentation device 22 is a desktop computer 32, a telephone, including cellular, wireless or wired telephones or smart phone 34 (e.g., iPhone® or Android® device), a laptop or notebook computer 36, a tablet, a slot machine interface 37, or any other computing device without limitation.

The input device 30 may include a keyboard, mouse, joystick, touch-screen, buttons, track-balls, microphones, voice and gesture recognition components, or any other component known in the art to be capable of receiving input from a user. The communication interface of the presentation device 22 may be configured to permit data to be transmitted and received from components of the presentation device 22. The communication interface may support wired or wireless communications using various protocols, such as 3G, 4G, IMT, GSM, TCP/IP, Bluetooth, 802.11xx, etc. The communication interface may also be used in conjunction with alternate reality (AR) or virtual reality (VR).

The activity management server 24 includes one or more processors for executing program instructions, memory for storing data such as program instructions, and at least one communication interface for forming a communication link to at least one presentation device 22. In some embodiments, the activity management server 24 is communicatively coupled to a data storage device, such as a hard drives or database. The activity management server 24, or coupled data storage device, may store data, such as participant statistics, event schedules, images of participants, data regarding matchups, data regarding scores, data regarding rankings, data regarding game configurations, user account information, history of success of the user, and other data.

The server 24 may also be configured to communicate, via its communication interface, with other devices to obtain data, such as configured to communication with another server or device to obtain game schedule information, updated player rosters, etc. In some embodiments, the activity management server 24 includes a user station that permits an operator to interface with and manage the activity management server 24, such as to change operator settings.

Aspects of the invention may be implemented via a distributed architecture, a cloud server architecture, a client-server architecture, or using any other system architecture known in the art.

Aspects of the invention may also be implemented as an "app" (e.g., downloadable, installable or installed software) which runs on the presentation device 22. For example, embodiments may include a "mobile client" that comprises a downloadable app. For example, a user may download an app from the operator or from an app store. The app may be stored on the user's presentation device 22 and then be executed by one or more processors thereof. One advantage of the downloadable app is that a much more engaging and rich media experience may be provided to the user. Further, enhanced security features including authentication and verification of identity, location, and other factors may be implemented on the app to deliver a compliant and secure experience for the user. The mobile client may be configured to interface with the activity management server 24, such as to receive information from that server 24 and to transmit information to that server 24, as well as implement other functionality.

Figure 2:
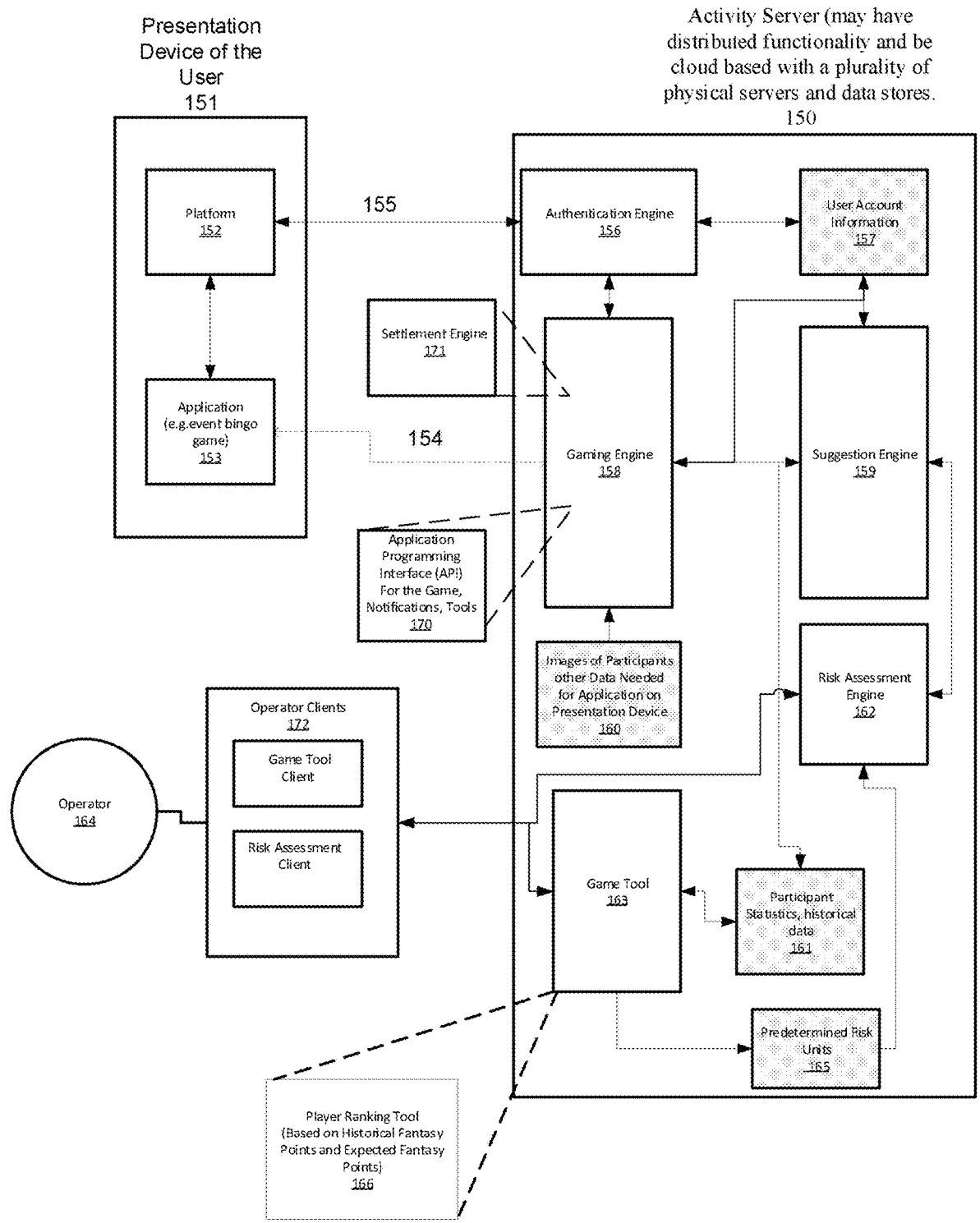
FIG. 2 is a block diagram of a platform, implemented in the network environment of FIG. 1, for performing games of skill and chance in accordance with embodiments of the present invention.

FIG. 2 is a block diagram of a platform, implemented in the network environment of FIG. 1, for serving games in accordance with an embodiment of the present invention FIG. 2 shows some of the internal components within the activity server system 150 and within the presentation device 151 of a user. In some embodiments, the activity server system 150 is the activity management server 24 of FIG. 1 and the presentation device 151 is one of the presentation devices 22 of FIG. 1.

The user first communicates through the presentation device 151 with the activity server system 150 and downloads a platform 152. The platform 152 is then run on the presentation device 151. The platform 152 provides an interface between the activity server system 150 and any platform-specific game application 153 that is downloaded to the presentation device 151. The platform 152 may perform some or all of the authentication processing and determines if the user meets with a set of compliance criteria to use the platform 152. The user downloads a platform specific game application 153 to the presentation device 151 from the activity server system 150. The platform specific game application 153 includes hooks, such as API function calls to the platform. Thus, the game application 153 only operates if authorized by the platform 152.

The compliance criteria may be based upon local or national laws and determining whether the user complies with such laws. For example, the platform 152 may have access to GPS information, or IP-based location information and may use this information to select the compliance criteria based upon location. Additionally, the age of the user may be pertinent as jurisdictions may have various age requirements. Thus, the platform 152 interfaces with the presentation device 151 and extracts information from one or more sources (e.g. GPS data, IP information) or may require the user to enter a password or answer a series of questions to validate the user's identity. Once the platform 152 determines that the user is an authorized user and one that meets the compliance criteria, the platform 152 grants access to the application game and allow the application game to either communicate 154 directly with the activity server system 150 or communicate 155 with the activity server system 150 through the platform 152.

The activity server system 150 may include one or more servers (e.g., management server 24) and may operate in a distributed computing environment. Thus, the functionality performed by the computer-based modules of the activity server system 151 may be distributed across processors or devices. The presentation device 151 (e.g., presentation device 22) of the user interfaces with one or more computer-based modules of the activity server 150 through a communications network. The activity server system 150 receives a request to play a game from the presentation device at an authentication engine 156 and receives a key that indicates that the platform 152 has confirmed compliance. The authentication engine 156 accesses a user's account information module 157 and obtains the account information for the specified user. The authentication engine 156 may perform additional authentication based upon data passed from the platform and the user's account information.

Once the authentication engine 156 is satisfied, the authentication engine 156 accesses the gaming engine 158. The gaming engine 158 provides game information (e.g., matchup data, over-under data, graphical images, statistics, etc.) to the game application 153 on the presentation device 151. The gaming engine 158 is in communication with a suggestion engine 159, an image database 160, a participant statistics and historical information database 161. The gaming engine 158 gathers this information and formats the information in accordance with a protocol that is recognized and understood by the game application 153. The game application 153 receives the data and incorporates the data into one or more templates for presentation to the user. Additionally, the application program 153 provides an interface for the transmission of selection data and other game related data to the game engine 158.

The suggestion engine 159 provides a series of risk units (e.g. matchups, over-unders, toggles) to the game engine 158 based upon a plurality of factors including: the specific user and his likes and dislikes (e.g., as to teams, particular participants, etc.), a risk assessment engine 162 determination, and a set of predetermined risk units. The predetermined risk units are determined by an operator, who is knowledgeable about the specific activity or activity of the game, or automatically determined by the suggestion engine 159 based on various criteria, including statistics and historical data associated with the activity or activity participant and accessed from database 161.

A game tool 163 is provided to the operator for assisting the operator in his risk unit selections. The tool 163 may include a graphical interface and accesses participant statistics and historical data in a database 161. The operator 164 determines risk units and stores them in a database 165.

The suggestion engine 159 communicates with a risk assessment engine 162. The risk assessment engine 162 receives all of the predetermined risk units from the database 165 and determines whether certain ones should be eliminated based upon a criteria set. As expressed above, the risk assessment engine 162 may eliminate matchups, over-unders and toggles based upon player injuries, or if a determination is made that a matchup is no longer an even match or the predicted score of the over-under is no longer a likely score. The risk assessment engine 162 may receive data from one or more locations about matchup, toggle and over-under selection by users. If the matchup/toggle selections reach a predetermined percentage in favor of one of the participants, the risk assessment engine 162 may remove the matchup from the list of possible matchups. If the over-under selections reach a predetermined percentage in favor of going over or under the presented score, the risk assessment engine 162 may remove the over-under from the list of possible over-unders. The risk assessment engine will operate on single events (projected teams or athletes or other events) or more complex or conditional outcomes. It should be understood by one of ordinary skill in the art that other analytical tools may be used for assessing risk and making determinations about which risk units to eliminate from presentation. For example, one may not wish to include two match-ups having players in the same game. Additionally, it should be recognized that the risk assessment engine 162 continues to operate during the playing of the sports games or other events and can cause the risk units displayed between end-users to change. The risk assessment engine may allow for an operator to respond to the identification of a risk and to take action based on that risk by instructing the activity server 150 to change the predetermined risk units as stored in data source 165. Risk can be identified based upon information, such as a report about an athlete, an injury report, information posted on a news or blog website. The risk assessment engine may include a web-monitoring tool for each player that is part of a risk unit, such that information about the player is collected and represented to an operator. Additionally, the risk assessment engine may be regularly updated based upon award entries. For example, the risk assessment engine may provide a listing of the 10 highest matchups with the greatest risk. The risk could be based simply on an imbalance in sales or on a more complex formula. Additionally, the risk assessment engine 162 may monitor all of the selections by users and identify if there are imbalances based upon groups of matchups, toggles, and over-unders that show an imbalance in the selected risk units. The risk assessment engine includes a graphical user interface that displays the risk units with the greatest risk and reports on developing news about players where imbalances in selections are occurring. For example, the 30 highest matchups that have the greatest risk may be presented and a news ticker of information about the players in the matchups may be included from either a general web search or by monitoring specific websites (sports-related websites, e.g. ESPN, NBA, MLB etc. or fantasy sports-related websites) for the names of the players in the matchups. Thus, the risk assessment engine allows for monitoring of risk in real-time.

In embodiments of the invention, the risk assessment engine can be automated based upon threshold values to remove matchups, toggles, or over-unders. For example, there may be a monetary threshold for a matchup that causes the matchup to be removed, such as, a statistical differential in award entries or wagers on one player or team or if more than 80% of the wagers are on one potential event outcome.

The risk assessment engine 162 passes the risk units to the selection engine 159. The selection engine 159 may then further eliminate some of the risk units. For example, matchups or over-unders that include a participant from a favored team of the user may be preferred. Similarly, match-ups or over-unders that include participants from a team that the user does not like may be given a lower priority. Other factors may be used by the selection engine 159 in determining the risk units to present as discussed above. The process of determining which risk units should be presented at a higher or lower rate may develop a pruned list of risk units.

The game engine 158 then sends the pruned or unpruned list of risk units from the selection engine 159 along with images of the risk unit participants, statistics of the participants and other data needed by the application game 153 for providing the intended visual and game experience to the user on the presentation device 151 through a secure network connection 154. For an array game, in some embodiments, the application game 153 may present an array of position units (e.g. "squares") for the application game 153 for the user to associate each square with one of the pruned matchups or over-unders. In other embodiments, the game engine 158 uses a random or algorithmic method for selection of the advanced choice games for the entries of the array. In some embodiments, the platform also uses a random or algorithmic method for determining the placement of the selected risk units into the entries of the array. In some embodiments, the platform also uses a random or algorithmic method for determining the placement of the selected risk units into the entries of a ranking array. In some embodiments the platform uses a random number generator to assign numbers to potential winners, and to provide winning numbers to match in event bingo games. The activity server system 150 may also have an engine which provides chances of a reward winning pattern occurring depending on the set of reward winning patterns. Dependent on the chances of each reward winning pattern occurring, a set of fixed odds payouts for each reward winning pattern may be determined. In some embodiments the fixed odds payout may depend on the potential winners selected. The fixed odds payouts may be determined such that the chance of a non-negative return are unlikely. Promotional payouts may also be determined such that the chance of a non-negative return are more likely than in other embodiments. The engine calculating the chances of a reward winning pattern occurring may take into account the chance of a user or computer selecting a winning selection in each risk unit. While this may typically be 50% where there are 2 potential winners, the activity server may be able determine fixed odds for non-negative return when the risk units do not present 50/50 chances.

In one embodiment the platform 152 and the application 153 are client programs that run locally on the presentation device of the user. The various components of the activity server system can communicate with one another through an Application Programming Interface (API) 170. The API 170 allows for the communication of the game information between the application 153 and the gaming engine 158. Additionally, the API 170 can be used for supplying both tools such as the matchup & over-under tool and the risk assessment engine to a presentation device of the operator 164 in the form a client programs 172, so that the operator may remotely monitor and make changes to the game without the need to be directly connected to the activity server system 150. The application game 153 receives this data and incorporates the data into one or more templates for presentation on the display associated with the presentation device 151. Communication continues between the game engine 158 and the application game 153 until the end of the session.

The user's selection is saved and stored in a database 157 associated with the user's account. The game engine 158 includes a settlement engine 171 that also determines whether the user has selected one or more winning participants, whether the winning participants are in a row of the tic-tac-toe board, whether winning participants are in a row of a ranking array (and correctly ranked), and whether random number assigned to a user's selection matches an independently chosen random number in event bingo. The game engine 158 informs the application game 153 whether the user has won the game based upon the game rules. The settlement engine 171 is also configured to provide payment to a winning user and may interact with the user's account information data store 157 to determine where any winnings should be transferred (e.g., a banking account, such as a checking account or other account such as PayPal account).

The activity server system 150 may also include a virtual machine to generate diagrams and descriptions for presentation to the user on the presentation device 151. The activity server system 150 may also include an integrity tool. If the individual athlete is not performing as expected, the integrity tool predicts and measures continuously the market and performance expectations of the participants of the advanced choice games.

Figure 3:
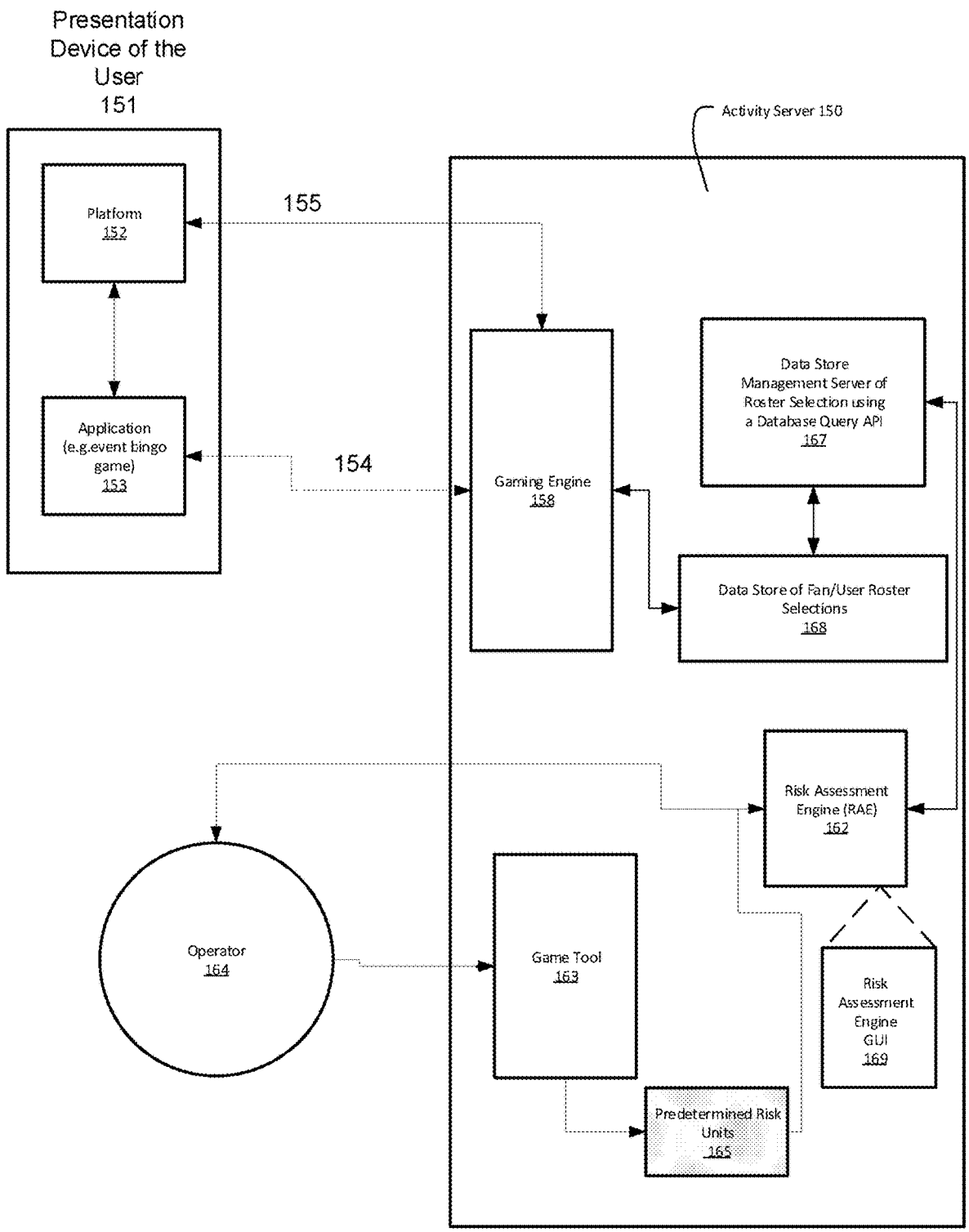
FIG. 3 is a block diagram of the platform of FIG. 2, further configured with a risk engine user interface 169 and roster listing data store 167, in accordance with an embodiment of the present invention.

FIG. 3 is a block diagram of the platform of FIG. 2, further configured with a risk engine user interface 169 and roster listing data store 167, in accordance with an embodiment of the present invention. The risk assessment engine 162 include a graphical user interface 169 to allow an operator to view a listing of correlated roster payouts (wherein a roster is the selection by a user of a pre-defined number of matchups or toggles and selected winners for those matchups/toggles or a pre-defined number of over-unders and selected over or under predictions for the presented score), or a pre-defined number of a mix thereof, and roster counts ordered by potential payout amount to determine the riskiest combinations, which would be presented at the top of a listing in the graphical user interface. As indicated above, the risk assessment engine GUI 169 may be local to the risk assessment engine 162 or a client application may be available to an operator such that the GUI 169 is presented remotely on the presentation device of the operator and the operator can remotely monitor the game and any risk determined by the risk assessment engine 162. The risk assessment engine 162 may include a set of predefined thresholds or the operator may set a threshold value for each number of picks of potential payout maximums and roster count maximums. In one embodiment of the invention, the risk assessment engine is configured to highlight and present selection groups above a threshold in the graphical user interface with some indicia, such as highlighting the selection group in red. The risk assessment engine may also generate alerts, which can be auditory or may generate an e-mail notification to one or more operators. Depending upon the configuration by the operator, the risk assessment engine may automatically close individual matchups when a threshold level has been met without requiring authorization from an operator. The thresholds may be determined at the discretion of the operator, but will be based at least in part on an expected number of users submitting rosters along with historical information concerning payouts.

As shown in FIG. 3, the roster selections by user playing the fantasy game or team based game (user roster data) are sent from the presentation device of the user through the network connection 154 between the application 153 and the gaming engine 158. The data received by the gaming engine will include the ID number for the user, a description of the selected roster including the number of picks, whether the picks include a hedge, and an array of selections for each risk unit within the roster. Thus, the array will include a pointer to the selected athlete in each matchup selected by the user. Additionally, other parameters may be communicated when the roster selections are transmitted by the application 152 running on the presentation device of the user 151, including the location of the presentation device.

On a periodic basis or at the request of an operator, the risk assessment engine queries the data store management server 167 using a database query API to query the data store of user roster selections. The database of the data store 168 contains all of the currently active user roster selections for all of the users playing the fantasy game. The API query will produce a report to the risk assessment engine. For example, the database query may produce a report that indicates the N-riskiest selections in terms of overall possible payout disparity for matchups or over-unders. Other database searches may be used to provide information concerning risk to the risk assessment engine. The risk assessment engine will receive the results of the database query in the form of a report, such as a data file in a predefined format in conformity with the database API. The risk assessment engine parses the report and compares the entries within the report to a threshold value that has either been preset or set by an operator. For example, the threshold could be based on a percentages of disparity, such as 40% of the users betting on one athlete or team, or the threshold could be in the disparity of the total amount bet, such that a payout that included a matchup may exceed $500,000. Again, other thresholds can be established based upon the risk without deviating from the intended scope of the invention. It should be recognized by one or ordinary skill in the art that the data-base and data management server may operate as part of the activity server system or may be outside of the activity server system. Additionally, the data store management server may periodically push the results of a pre-set number of database queries to the risk assessment engine within the risk assessment engine needing to query the data store management server 167.

In one embodiment of the invention, risk units may be presented on a customized basis to fans. Customization of risk units occurs in the suggestion engine 159 that takes into account the user's account information and profile data stored in a datastore 157. For example, while a plurality of users may be presented with the same card or set of matchups, set of over-unders, or mixed set of matchups and over-unders, the order of how such is presented may be customized. As one example, the first presented matchup may be selected based upon the location of the user or based upon a fan's profile. If the matchups include a matchup involving Drew Brees, fans who are located in Louisiana or identify themselves as New Orleans Saints fans may be presented with a set of matchups where the first matchup is the matchup involving Drew Brees. Thus, the order or configuration of the matchups, over-unders, or mix may vary based upon geographic region, time of year, rankings of players or teams, user's input or profile data or other criteria. In addition, the graphical presentation of the matchups and over-unders may be changed based upon such criteria.

Figure 31A:
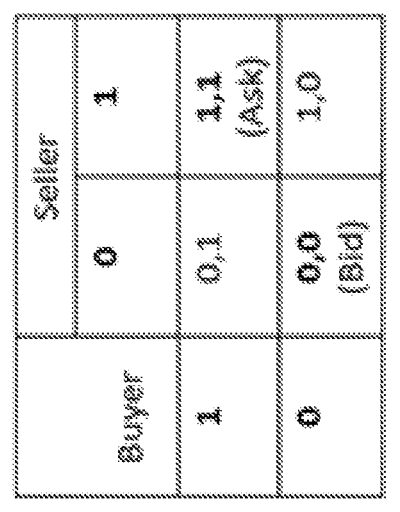
Figure 31C:
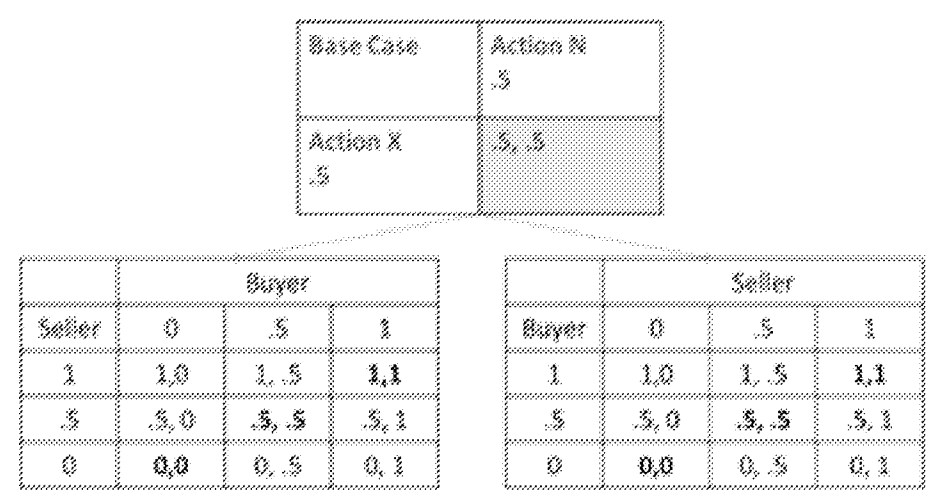

FIGS. 31A-C are block diagrams showing the determination of risk used to assign fixed odds payout to matchups and over-unders, in accordance with an embodiment of the present invention.

The challenge for crafting game products from joint and several events is embedded in the idea of a game itself. One category of game that is generally understood is Oskar Morgenstern and John von Neumann's explication of the Prisoner's Dilemma, wherein the games of cooperation, incomplete information, and optimization are characterized by the set of possible outcomes.

In the prisoner's dilemma the game is assumed to have positive and negative potential outcomes, with the simple version concerning two participants each participant having a potential outcome that may be positive or negative. Each participant experiences an outcome which is based, at least in part, on the performance of the other participant. If both participants exhibit behavior in which each participant cooperates with the other participant they may experience a positive outcome. Similarly, if both participants exhibit behavior in which neither cooperates with the other, one may receive a positive outcome while the other may receive a negative outcome. More generally, in this context the individual participants always have an incentive to choose in a way which creates less than optimal outcome for the participants as a group. The game is assumed to be one cooperation to evade a negative outcome—if both participants behave optimally both are successful, if neither cooperates both realize negative outcomes, and two possibilities for partial results of partial cooperation.

A uniformity of outcomes to either both mutually negative or both mutually positive represent the participants' weighting of their information and the result of the mutual actions. One can treat these as equivalent to market instructions, with a mutual negative decision around a sell game as resulting in a sell decision, and a mutual decision around a buy game resulting in a buy decision.

In the event of machine learning there exist two categories, supervised and unsupervised learning. Supervised learning uses decision trees, naïve Bayesian classification, ordinary least squares regression, logistic regress, support vector machines, and ensemble methods amongst others. Unsupervised learning uses clustering algorithms (such as Eigen vectors), principle component analysis, singular value decomposition, and other tools and methodologies. Both are producing signals that produce expected values where the ratio of "true" to "false" is better than random, i.e. has a ratio that is better than the coin toss of 50% probability. While adjusted probability is typically the result of what is called a Bayesian Nash equilibrium, which is not the only form of game production. The expected value can be also represented as a state of the data that may also form the expectation of probabilistic outcome.

In such a circumstance the above Prisoners Dilemma becomes a set of high confidence intervals of 0.5 (50%) probabilities and can be represented as an array set for each characteristic or information signal that produces the expected result. As such the reading or a game theory around an event has advanced to a set of statements around the data itself rather than the expected value of cooperation. In such a set, the instructions for the probability are around the "memory" of the game, i.e. its data being available to calculate, and the calculation instructions themselves.

As shown in FIGS. 31A and 31B, partial payouts on both buy and sell games are calculated by the platform. Three states of informational results exist in a machine learning game: a buy decision, a sell decision, both starting from a base decision. As such any game therefore be set as being the result of an array set of 0.5 probability sets (shown in FIG. 31B) as the game in digital format depends on the player deciding whether they agree with the base case.

As shown in FIG. 31C, a game can now be created from any array which the game is executed whereby the probability of outcome is a machine learning based expectation of an equivalent result whereby the game contestant identifies an expectation where they believe the game maker is incorrect in producing a game of ($A_{NX}$), for any array set. Thus the general game is for any and all variation on a game wherein A and X may be of any value of 1 or more, and where A may or may not be equal to X. The commercial value of the game is the ability to predict the required number of contestants for any array at a payout that may be both for single or multiple outcomes and which also produces a risk statement of how stable much the prediction of 0.5 be to maintain the stability of the expected reward.

This relationship can be described as being the organization of "tuples" various arrangements of X, N in an array such that a central limit theorem relating the expected payout to the contestant can be calculated based on the number of contestants to produce a fixed payout knowable for a statistical level of risk and ordered by a central limit theorem. Such a set involves the conditional performance of the contestant in correctly ascertaining the performance of a real word athlete or athletes or other efforts resulting in a final performance at a measurement of the least means squared adjusted or some other measurement of risk adjusted expected performance. Such a measurement may be in the single incident of an athlete, team, or a real world event. Such an event may be on a continuous polling basis, or in the form of a final polling outcome, i.e. a vote.

Moreover, the form of the X, N can also be conditional in series, such that the array can be arrangements of X, N in series as reflected by [ ]. Such a three dimensional game also offers the same underlying games, where by a computer recursively and heuristically solves for a set of arrays which may also be considered as a machine learning based game for enthusiasts seeking to have a 2×2×2 game or a 3×3×3 game, or a 1×2×3 game. Indeed the computer process is such that a 1×10 game is defined as being a $N_1 \times X_{10} \times \{0\}$ game—the instance of a the second array is defined as being a null set $\{0\}$ or $\emptyset$ game rather than not existing at all.

In all circumstance, the fixed reward for correctly defining the array outcome of N, X can be defined by the necessary levels of customer participation for the reward payout be at an expected level. Rather than the game maker making money from the differential between two reward outcomes based upon the buyer vs. the seller of the reward, the reward payout can be defined as fixed for a previously defined level of customer activity. The revenue model exists in the discount to the reward payout at a discount to the theoretical value of the reward given the predicted required levels of customer activity. Moreover the rewards can themselves be fixed on a progressive basis. Thus while one embodiment may require a 6 out of 6 selection to obtain a reward, fixed odds payouts can be defined for the given levels of player activity for 4 out of 6, 5 out of 6, and 6 out of 6 correct selections.

Various Embodiments of the present invention are implemented at a matchup game having a fixed odds payout. However, not all embodiments of the present invention are limited to such a matchup game. An over-under of an athlete offers similar array presentations for fixed odds payout based on actual performance. An over-under on a set of athletes or teams in a row across (1) and x (1 or more) down a column. In this embodiment, the computational system offers fixed odds payout with a single calculable value of all risks and expected outcomes for customer activity on the platform. Other games in embodiments of the present invention (e.g., parlay matchups, tic-tac-toe, ranking array, etc.) can be calculated based on a game algorithm, which is defined as a process or set of rules to be followed in calculations or other problem-solving operations. The rules can be particularly followed by a computational system that defines risk, reward and a further algorithm based on probabilities of liquidity expressed at each transaction for either cash or other reward format (possibly for token, loyalty program, merchandise, or liquidity rebate) that prove to have statistical value on the calculation of reward, risk and liquidity, i.e. customer activity.

The game algorithm exists as a separate mathematical formulation that has been deployed throughout the entire gaming platform. As a result new games are in continuous development based on the premise of the value of fixed odds payout in either matchup or over-under presentment but with single or instances or other formats. For example, when building ranking games, in some embodiments the platform develops ranking games build on top of event choice games, and in other embodiments the platform builds ranking games separately from event choice games.

In embodiments, rewards are available in two forms and can be continuously produced: (1) fixed odds payout with a single reward outcome; and (2) fixed odds payout with multiple reward outcomes.

The platform is data driven, which allows rewards to continuously deploy additional fixed odds payout at the player level for either athletes or teams in each of the games produced above. Moreover, the prizing or rewards can occur in the time interval both prior to the game and during the game itself.

The centralizing computational theory of the platform additionally allows multiple application programming interfaces to automatically generate similar games but across multiple events. Any sporting or athletic contest (defined as professional or amateur league or association) can be turned into game inventory. This further included racing formats such as auto or horse racing wherein the jockey and or the trainer are offered as athletes. Last, it includes awards or other reality shows, such as the Oscar, the Tony, the Grammy, the Emmy, the Country Music Awards, or game shows, all of which can be rendered to this game presentment of continuous fixed odds payout.

In sports gaming, three methods may be used to achieve a monetary benefit. First, a margin-based method takes a fee and manages a spread (margin) between buyer's price and seller's price. This method is based on game theory, and sometimes called a double-blind auction. The market-maker, through the platform, manages the prices of a seller's auction that is higher in price than in a buyer's auction. This premise of auction behavior is an essential part of game theory, and includes use cases such as Bayesian Nash price equilibrium. One risk is that to produce liquidity and attract larger wagers, the market-maker may need to act as principal in order to serially locate an offsetting buy or sell order.

Second, a volume-based method takes a percentage of total volume bet, with losers paying the winners on a pro rata basis from the pool of price entries. This method is called a pari-mutuel or rake system—no risk to the manager, but a high number of games at various price points for wagering means the business is highly dependent on marketing spend. Further, the data used by the method cannot be centralized, virtually assuring a direct-to-consumer model and low scalability. This model has been the backbone of horse-racing, poker, and daily fantasy sports.

Third, a margin-and-volume based method offers a fixed odds payout, with a fixed reward that is at the midpoint of predicted sellers and buyers price, but at a discount from the theoretical value expected for the payout on that midpoint for an expected number of players. Such a method is improved and used by the platform in embodiments of the present invention to determine the fixed odds payouts for the advanced choice games. This method uses machine-learning tailored to game theory. Rather than relying on the typical game theory treatment of probability, in this method, embodiments of the present invention reformulate the game theory to states of data as digital signals around the data with reward, risk, and liquidity all having a common centralized limit. Accordingly, for every level of reward and risk, this method calculates the value of that trade-off based on the value of the number of players of the games on a random basis producing a more efficient price. As every player gets the same odds, there is no need to add fractionated pools of liquidity to assure effective marketing. As the games are predictive to the midpoint, there is no need for the market-maker to accept principal risk to assure price. As primary risks of marketing and balance sheet exposure can be controlled, there is no marginal friction between margin and volume in working capital turns, i.e. no marginal OpEx or CapEx necessary to grow the business. In embodiments, the platform relies on the discount to the fair value of the model to determine the fixed odds payout.

Further, when teams are matched to payouts based on handicapped spreads, e.g., Team A at plus X points, the actual bet is on a portfolio of athletes. Fixed odds payouts of embodiments of the present invention are the foundational math for producing a sports book based on teams or other events—but using a more efficient pricing model.

Figure 28:
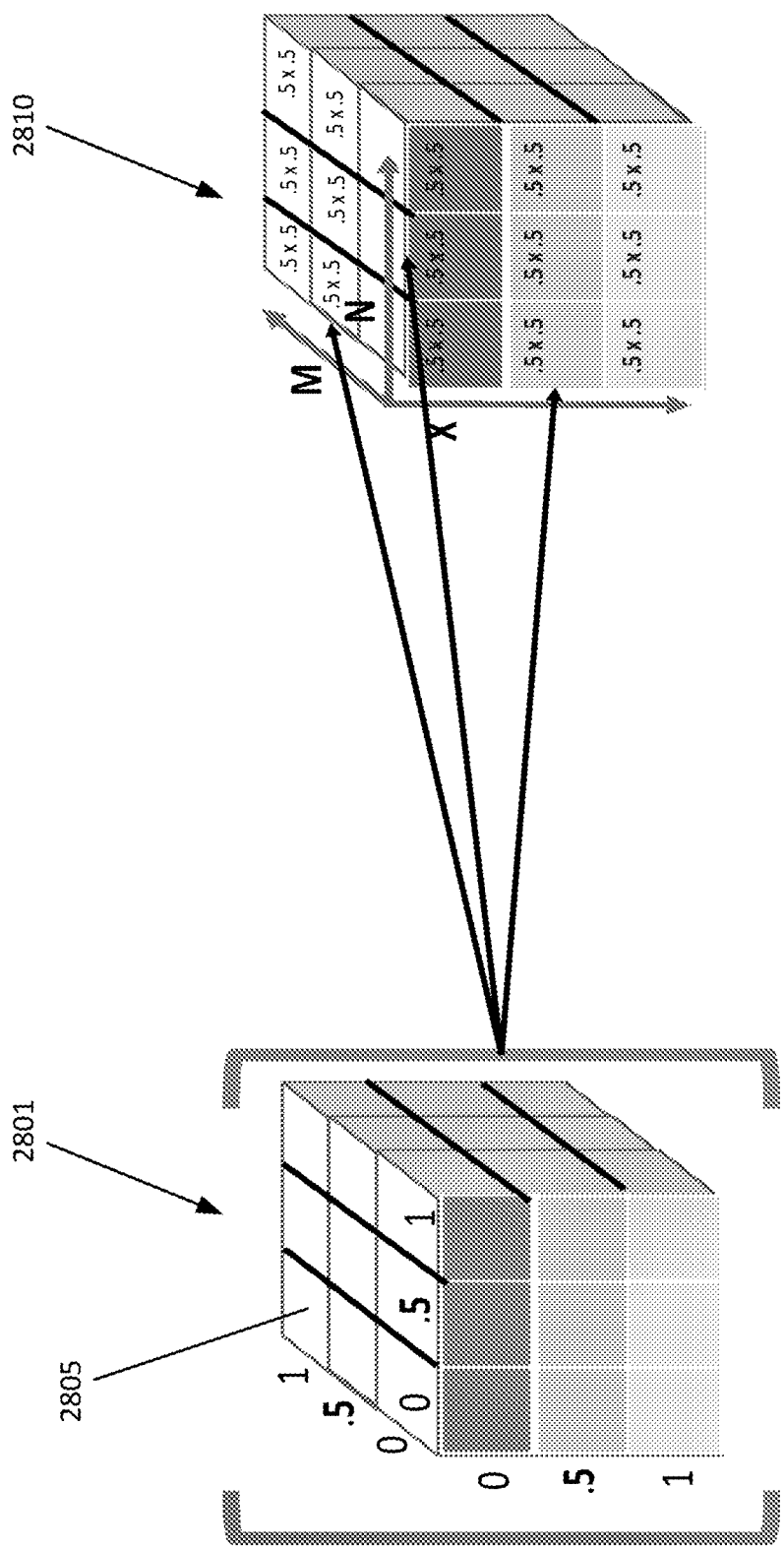
FIG. 28 shows how the platform might represent a number of games in a three dimensional space before reducing.

In some embodiments of the invention, the platform starts a game by creating a 3D advanced choice game as shown in FIG. 28. In on embodiment the 3D advanced choice game has 27 risk units 2805 in a cube 2801. In this embodiment each risk unit is a 3D block, and not the 2D surface of such block. However, in some embodiments each risk unit is the surface of a block. The cube 2801 has possible outcomes marked as 0, 0.5, and 1. The platform then determines, for a given game probability of 50%/50%, a reward for a winning pattern and a level of volume necessary for the theoretical value reward to be equal to the input as shown in cube 2810. In some embodiments the platform determines whether each risk unit in a game has a unique 50/50 chance. If one risk unit is the over-under on a player of team A and another risk unit is the over-under of the entire team A, the two may be linked such that the chance of success of picking over on both is higher than the 25% chance of picking two true 50/50s. In such a case, the two risk units would not each have a unique 50/50 chance. The platform would then adjust the risk units in a game to ensure the risk units are all true 50/50s. Alternatively, the platform may adjust the prizes to account for the adjusted chances of success due to non-unique risk units.

In some embodiments of the invention, a game can have more than two outcomes while still providing what we call here a 50% game probability. Consider, for example, a game having four potential outcomes. Ideally, the probability of each outcome would be 25%, but the ideal situation does not always prevail. With a game having four potential outcomes, the platform determines a margin of error associated with such platform's estimation of a 25% probability for any given outcome. For such game to have a 50/50 game probability, the margin for error, of the platform's estimation of each outcome's success, must straddle 25% equally in each direction. In some embodiments the game probability is not 50/50, and thus the platform calculates the rewards based on the percentage chance each potential winner will be an actual winner. In one embodiment the platform would base the fixed odds payout after the potential winner is selected. In another embodiment the platform would base the fixed odds payout on the outcome having highest chance of being the winning outcome. For any game and number of potential winners, the platform can calculate the probability of any number of given outcomes to determine the likelihood of a winning pattern being selected. From these likelihoods the platform further calculates the accompanying fixed odds rewards. By adjusting the fixed odds rewards and chances of winning (e.g. by changing the winning pattern) the platform can determine a projected payout percentage. In different embodiments the projected payout percentage is associated with a level of volume of sales of the game, sometimes referred to as liquidity.

To aid in the game operator's generating a profit from sales of the game, it is advantageous to find a balance which allows the game to payout a specific amount of rewards that both delivers profit and keeps user interest. For example, a game that paid out 70% of entrance fees would, in theory, be bought less by users than a game which paid out 98% of the entrance fees. However, the game offering 98% would need to sell 15 times more tickets to average a greater profit. The platform can derive a fixed odds payout that maximizes profits by varying the percentage payout of fees expected to be paid as fixed odds rewards.

Further, the operator may wish to limit the chances of a non-negative return. For any game based on chance, there is a chance that the odds will fall out of the operator's favor and more money will be paid out than taken in. There are two significant factors in reducing the chances of a non-negative return. First, the percentage payout, and second, the volume of sales. Since a higher volume of sales decreases the chance of a non-negative return, it allows the operator to offer higher percentage payouts, which increases user participation.

The platform does not have full control over the volume of sales, and thus uses volume of sales data to appropriately adjust the percentage payout to maximize profit for the game. In some embodiments, the platform collects user data and increases payouts to specific users based on their likelihood of winning, past participation, or other data features. The platform may also adjust the payouts universally.

Figure 29:
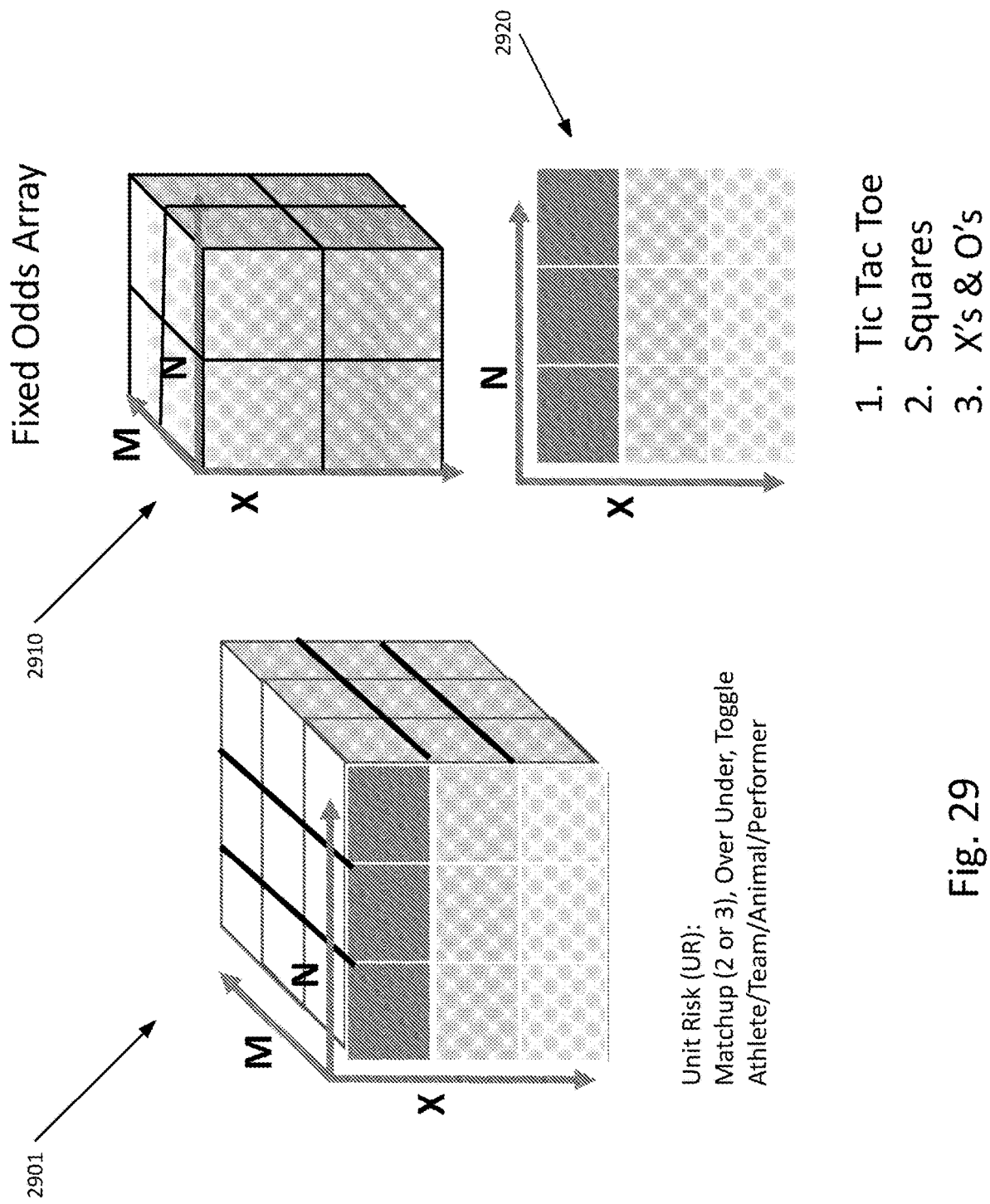
FIG. 29 embodies the platform in 3D and 2D array games.

FIG. 29 shows how the platform may derivate the 3×3×3 cube game 2901 into a 2×2×2 cube game 2910 or a 3×3 array 2920. The platform simplifies the original game 2901 into the derivative forms 2910, 2920 which may be less complicated to pay and understand how to win. These games may be further characterized based on the winning patterns selected by the platform. For example, 3×3 array 2920 may be broken down into Tic-Tac-Toe, Squares, and X's and O's. The games 2901, 2910, and 2920 may be further characterized as games of skill, class II games, or games of chance. A game of skill allows the customer to select a projected winner from the risk units. The class II games provide a bingo element to the games. In these games of chance the computer to generates the projected winner selections. The selections may be of a matchup (2 or 3), Over-Under, and toggle. The platform calculates the payouts for each game and each winning pattern within the game.

FIG. 33 shows how the platform may take different odds for two potential winners A and B. Potential winners A and B may have the same or different odds, and the platform determines the odds depending on whether the odds are: fixed, fixed progressive, dynamic fixed, and dynamic fixed progressive. In some embodiments the platform may calculate the odds for events having more than 2 outcomes. In embodiments where the odds for A and B vary the platform may calculate different prizes dependent on the potential winners selected by the user.

FIGS. 30A-H shows array and ranking games for which the platform can identify chance of success and fixed-odds payouts. In game 3010, shown in FIG. 30A, each row is a risk unit allowing selections of potential winners A, B, C. In some embodiments of game 3010, certain risk units may have different amounts of potential winners than others. For example the number of potential winners may include one, two, and three. Game 3010 then requires the projected winners to be ranked. The customer or the computer may rank the selections. The platform can decide different fixed-odds payouts based on the chance of success. The ranking may be based on a specific fantasy score, and determining a first rank would be done by determining which participant exceeded the spread by the highest margin.

Figures 30A, 30B, 30C, 30D:
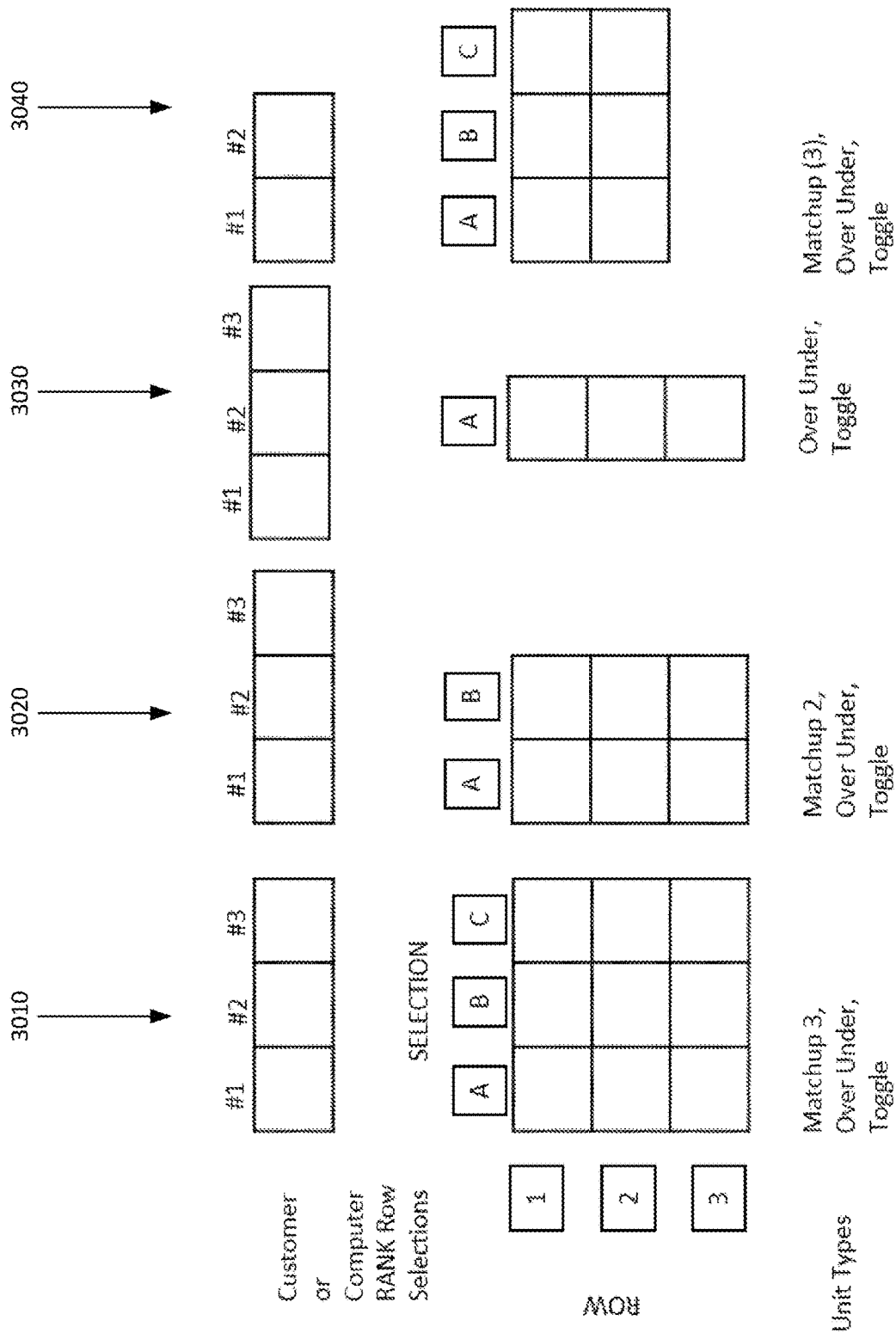

FIG. 30B shows game 3020 which is an embodiment where each risk unit comprises two potential winners. The potential winners are then ranked by the user or by the computer. FIG. 30C shows game 3030 wherein the projected winners are already selected for the user. In this embodiment, the game allows for the whole risk unit to be selected and the actual winners are ranked. FIG. 30D shows game 3040 wherein two risk units each have three potential winners. Since there are two risk units, there are only two spots to rank. FIG. 30E shows game 3050, wherein each of the two risk units have two potential winners. Some embodiments may include a combination of games 3040 and 3050 such that one risk unit has two potential winners and another risk unit has three potential winners.

FIGS. 30F-H show games 3060, 3070, and 3080 which are embodiments of a game having one risk unit. The single risk unit may have varying amounts of potential winners. In each game the platform may determine a chance of success of each risk unit and a chance of success at correctly ranking each risk unit. The chance of success may be converted into a fixed-odds payout for one or more reward winning patterns. Since each game can be calculated on its own, either derived from a previous game or done in separate calculation, the platform may determine a volume of sales based on the plurality of games. The platform may then determine a fixed odds payout based on the sale of a plurality of games and not on each single game.

Skill Based Games

Embodiments of the present invention include methods and systems for presenting pure skill-based array games to users.

Figure 4:
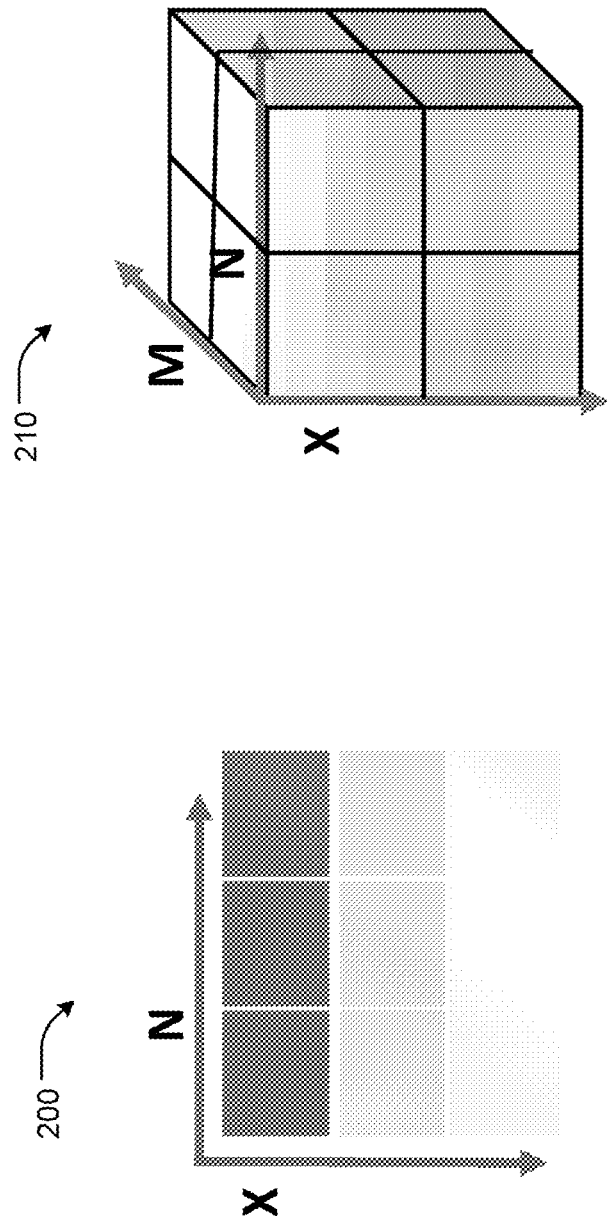
FIG. 4 shows an overview of some array based games manageable by the platform disclosed in the instant invention, which can be embodied as two-dimensional arrays or arrays of three-dimensional surfaces.

Multiple types of event bingo games can be constructed from arrays. In preferred embodiments, computer processes generate an array from a risk inventory of matchup, over-under, and toggle risk units. As embodied in FIG. 4, event bingo games can be constructed from two dimensional arrays 200 as well as three dimensional arrays 210 and array based games.

Some embodiments generate a set of matchups, such that each matchup pairs a first activity participant against a second activity participant. The matchups may include one or more participants from selection by the user. In some embodiments, a set of matchups are presented to the user as game components, and the user selects from the set to form a game.

Some embodiments generate a set of toggles (A versus B or C), such that each matches a first activity participant to multiple second activity participants. In some embodiments, a set of toggles are presented to the user as game components, and the user selects from the set to form a game. For each selected toggle, the user then selects which of the second activity participants to pair against the first activity participant in the matchup.

Some embodiments of the present invention generate a set of "over-unders." Each over-under presents a score for an activity participant, together with the choice of whether the actual score of the activity participant will be over or under the presented score. In some embodiments, a set of over-unders are presented to the user as game components, who selects from the set to form a game. For each selected over-under, the user then selects whether the actual score will be over or under the presented score.

Some embodiments generate a set that includes a mixed set of matchups (e.g., matchups, toggles, and over-unders). The mixed set is presented to the user as game components, and the user selects from the set to form a game. For any toggles in the set, the user then selects which of the second activity participants to pair against the first activity participant in a matchup. For any over-unders in the set, the user then selects whether the actual score will be over or under the presented score.

Some embodiments present an array choice game as a set of matchups, a set of over-unders, a set of toggles, or a mixed set of risk units as a two-dimensional or three-dimensional array. In some embodiments, an array is presented to the user, who selects a risk unit of either a matchup, a toggle, or an over-under for each position (e.g. square) of the array. In other embodiments, the system presenting the array automatically selects a matchup, toggle, or over-under for each position of the array. For any position that has a matchup, the user selects a "projected winner" of the matchup. For any position that has a toggle, the user selects which of the second activity participants to pair against the first activity participant in a matchup, and further selects which activity participant will be a "projected winner" of the matchup. For any square that has an over-under, the user selects the "projected winner" as a choice between whether the actual score will be over or under the presented score. For embodiments of a skill-based array choice game, if a user has made a sufficient number of successful picks and the picks are arranged in a game-ending pattern (e.g. three in a row for tic-tac-toe) then the user wins a fixed odds-based prize.

In some embodiments, there may be more possible entries than the number of positions in the array. In such embodiments, the platform uses a random or algorithmic method for selection of the risk units for the entries in the positions. In some embodiments, the platform also uses a random or algorithmic method for determining the placement of the selected risk units into the positions.

Some embodiments present a set of matchups, a set of toggles, a set of over-unders, or a mixed set as a ranking array game (array choice-plus-ranking game). In these embodiments, the array is presented to the user, who selects a risk unit for each square in a row of the array. In other embodiments, the system presenting the array automatically selects a risk unit for each square in a row of the array. For any selected entry that is a toggle, the user selects which of the second activity participants to pair against the first activity participant in the toggle matchup. For any selected entry that is an over-under, the user selects whether the actual score will be over or under the presented score. The user then ranks each square in the row from 1 . . . N, indicating how the user expects the matchup or over-under associated with that square to perform with respect to the matchups or over-unders associated with each other square in the row, multiple rows, or the entire array. In some embodiments, the platform uses a random or algorithmic method for selection of the advanced choice games for the entries of ranking array. In some embodiments, the platform also uses a random or algorithmic method for determining the placement of the selected advanced choice games into the entries of the ranking array.

In some embodiments, risk units are selected prior to the activity participants participating in the corresponding event (e.g., playing in a professional sporting event or other events). The set of risk units and the corresponding participants is referred to as "user roster data".

In some embodiments, these skilled-based games may be created based on single team performance projections associated with their game components, such as matchups, over-unders, toggles of a selected advanced choice game, such that these games are created for individual teams by mathematically calculating the portfolio of participants based on single participant prediction and statistical optimization. In some embodiments, these games may also be created based on single participant performance projections by prediction and statistical optimization of the scores of such participant.

The outcomes of the matchups may be determined with reference to the first and second participants' actual performance in one or more actual sports events or other events according to a predetermined scoring criterion. In one embodiment, the first or second participant(s) with better statistics in predetermined, weighted, statistical categories (e.g., a better fantasy sports score) in the one or more actual sporting event(s) may be determined as the "winner" of each matchup. In various embodiments the fantasy score is related to an event choice, an event ranking, and an event choice and ranking. These fantasy score matchups may be developed as array-based games. In some embodiments, the winners of the matchups may be compared to the user's picks.

The outcome of the over-unders may be determined with reference to the participants' actual score in one or more actual sports events or other events. In one embodiment, the predetermined, weighted, statistical categories (e.g., a fantasy sports score) may be determined as the participants' actual score compared to the user's pick of over or under the score presented to the user.

In a straight matchup, toggle, over-under, or mixed game, if the user has made a sufficient number of winning picks, then the user may be declared to be a winner of the activity. In the tic-tac-toe game, if the user made winning picks that form a sufficient number of rows, columns, or diagonals, then the user may be declared a winner of the activity. In the ranked array game, if the user made a sufficient number of winning picks and/or rankings of the winning picks, then the user may be declared to be a winner of the activity.

Accordingly, embodiments require a fixed odds payout table and each user has an opportunity to win against the system. The fixed odd payout table indicates varying fixed odds payouts based on the number of matchups/over-unders selected, etc. This is in contrast to other games, such as pari-mutuel games, where users play against other users and payouts are based upon the amount of money that users associate with their selections. The payout may be based on a fantasy-based scoring which is "performance based scoring" and in the context of teams the scoring may include points scored as presented within these unique games and on the system that scores both participants and teams through a single risk management system.

When the user is a winner of a game, the user may be awarded a reward according to a fixed odds payout table, which may be predetermined fixed odds, dynamic fixed odds, fixed odds progressive, and dynamic fixed odds progressive. For dynamic fixed odds and dynamic fixed odds progressive payouts, the system may dynamically price the payouts using techniques selected from the group consisting of AI, machine learning and, other algorithmic data analysis of reward, risk, volume, and total risk, and combinations thereof. Each of these payout types is also captured and monitored by the risk assessment system.

In some embodiments, the user may win a fixed odds payout as a cash award or other fixed reward for correctly picking actual winners, or for correctly picking a predetermined number of actual winners (e.g., for getting close). The awards may vary depending on the number of actual winners selected. In another example, the user may win such a fixed odds payout for correctly picking actual winners that form a row, column, or diagonal in a tic-tac-toe board. The fixed odds payout may vary depending on the number of rows, columns, and diagonals formed by the actual winners selected. In a further example, the user may win such a fixed odds payout for correctly picking and ranking actual winners in a row of an array. The award may be progressive, such that winning all matchups in row wins a reward, and progressively higher rewards are given based on the number of those matchups are correctly ranked within the row.

The use of fixed odds payout games is a pronounced innovation over prior art because it reduces the complexity of multiple sports (or other events) and multiple teams and multiple athletes to single application of the game as a user interface across multiple clients. Accordingly, in these embodiments, events can be virtualized, i.e., turned into a game. In these embodiments, the consumer, perhaps the audience, a spectator, or a fan is presented with an objective expectation of rewards with a single set of rules for each game no matter what the athlete, team or sport. In the case that the fantasy sports examples used herein are used as aspects of the user interface, in these embodiments, the performance scoring of the particular event may be based on the reduction of the performance data to an application programming interface and then used to score the new games described herein. The fixed odds payout simplifies the performance expectations to concrete expectation of reward based on the calculations of the event result. Further, in some embodiments, the platform's production of a new class of games (further described herein) take all events and reduce them to a single expected prizing format and is able to evaluate the variable and fixed risks based on projected event scoring, discount to the theoretical value based on total entries and the basis risk of those entries. Such prizing format is completely unlike "Totes" or pari-mutuel where the odds of success depend on the actual vs advertised rewards. Creating a finality of the expectation at the time of reward entry radically, in these embodiments, changes the idea of the value of the event as a prizing tool for fan or audience engagement.

Figure 16:
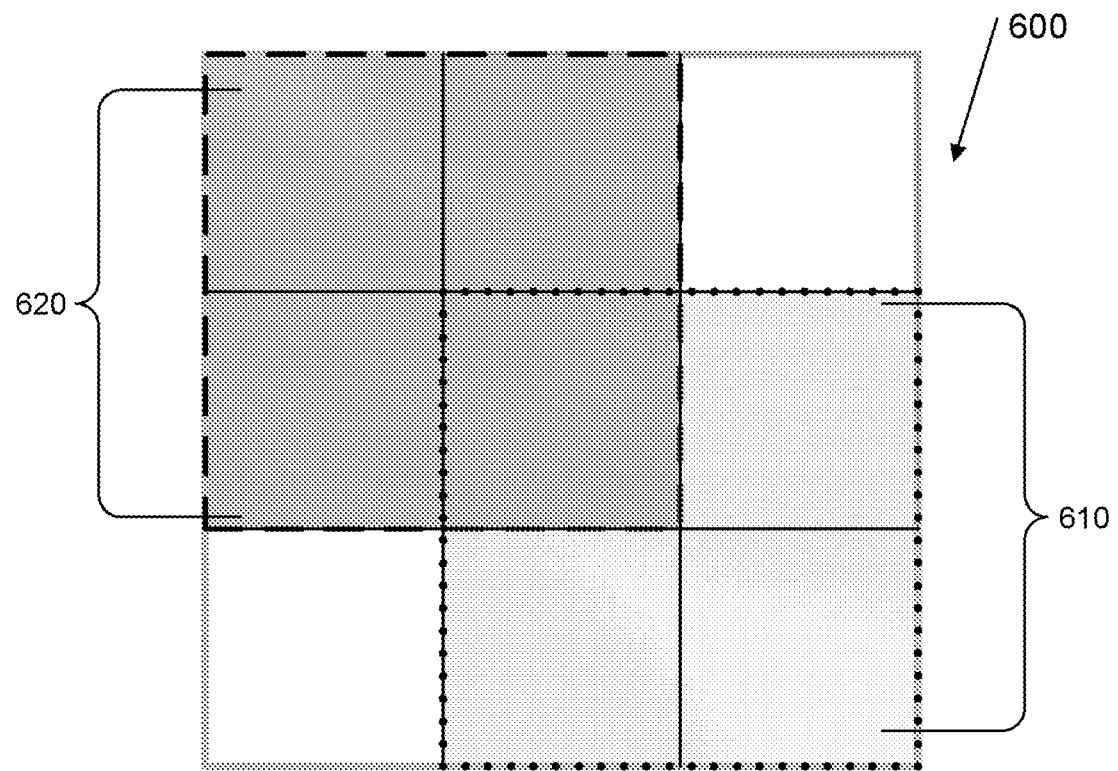
FIG. 16 provides an embodiment of a 3×3 squares game, for which a game-ending pattern is one of four possible 2×2 squares.

FIG. 27 shows a ranking array screen layout in accordance with an embodiment of the present invention. The user is presented with a set of three risk units, 1, 2, and 3, with potential "winners" 1A and 1B, 2A and 2B, and 3A and 3B, respectively. The user first makes a selection of "winners" and then ranks the choices based on the difference in the performance between the winning and losing choices. For example, if 1, 2, and 3 are matchups and the "winner" is based on winning score, then the winning ranking would rank the matchups from highest difference in fantasy point to lowest difference in fantasy points between the winning and losing scores. For the ranking game shown in FIG. 27, the user-selected winners are compared to the actual winners, and the actual ranking of winners based on the actual differences in the performance between winning and losing choices, as determined by actual events. Prizes are awarded based on correctly selecting and correctly ranking winners. "Squares" is an array choice game formed from a square array of N×M positions, each position being a 1×1 square associated with a risk unit. A winning pattern for this array occurs when winners are correctly selected corresponding to position in the N×M matrix that form an Y×Z square, where Y<N and Z<M. FIG. 16 provides a 2D embodiment of "squares," formed from a square array of 3×3 positions, for which the winning pattern occurs when any of four possible 2×2 squares are correctly associated with winners. In other embodiments, as discussed below, squares may be a 3D game. A first such square 610 is shown in light gray with a dotted line border, and a second such square 620 is shown in dark gray with a dashed line border. The remaining potential winning 2×2 squares, at the upper right and lower left of the 3×3 square are not specifically illustrated. Because the central 1×1 square is required in order to form a 2×2 pattern, a consolation prize may be given for users that correctly select four or more positions that do not form a square.

Figure 17:
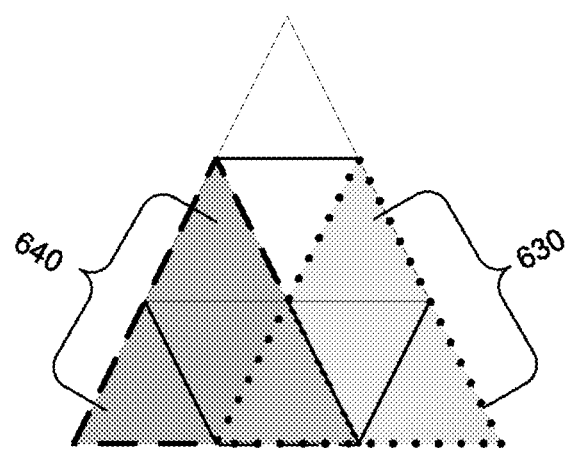
FIG. 17 embodies a 3×3 triangles game, for which a game-ending pattern is one of three possible 2×2 triangles.

Array games similar to "squares" can be formed with other geometric objects. FIG. 17 shows a "triangles" game formed with 2×2×2 equilateral triangles within a 3×3×3 equilateral triangle. In this case there are three possible game-winning 2×2×2 triangles, each formed by four 1×1×1 triangular positions. A first such 2×2×2 triangle 630 is shown in light gray with a dotted line border, and a second such 2×2×2 triangle 640 is shown in dark gray with a dashed line border. The remaining potential winning 2×2×2 triangle, at apex of the 3×3×3 triangle is not specifically illustrated.

Figure 18:
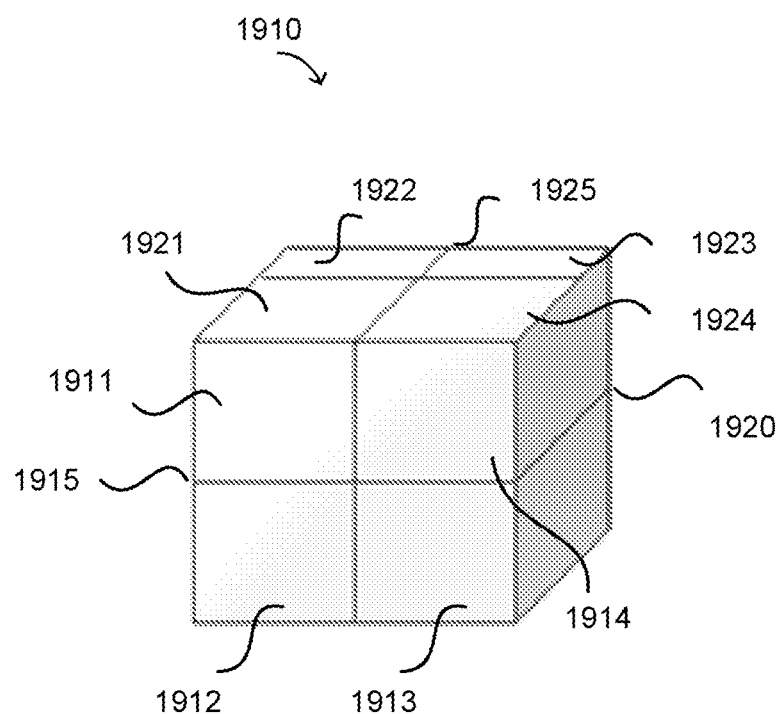
FIG. 18 embodies a three-dimensional array game with the array mapped to the surface of a cube.
Figure 19:
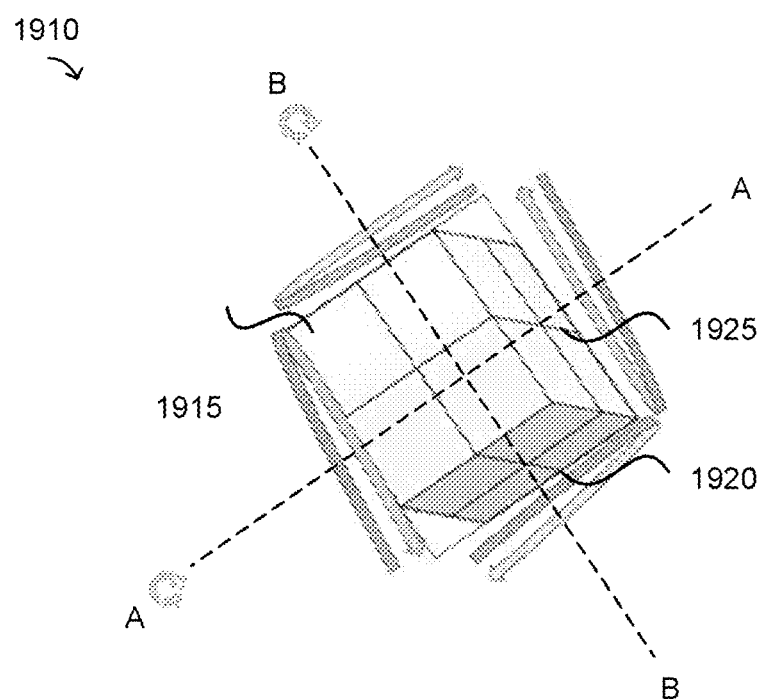
FIG. 19 shows how the three-dimensional array game of FIG. 18 can be rotated to display different positions on the surface of the cube.

Another family of array games arranges positions, represented as squares, triangles, or other two-dimensional geometric objects on the surface of a three-dimensional geometric object. In FIGS. 18 and 19 is shown an embodiment for which square positions form a three-dimensional array on the surface of a cube.

In some embodiments, the 3D cube game is presented to the user in a 2-dimensional (2D) display and, in other embodiments, the 3D cube game is presented to the user in a 3D display, such as in an augmented reality or a virtual reality environment. In embodiments, the game components may include choices of winning athletes, teams, or other choices of outcome in an event.

In the embodiment of FIG. 18, the game is configured through graphical interaction with a presented 3D cube 1910. The cube 1910 has six faces, including the faces 1915, 1920, 1925 shown in FIGS. 18-19. Each face is configured with a set of positions (shaped as squares), and each position is associated with a risk unit. For example, face 1915 has the four positions 1911, 1912, 1913, 1914, and face 1925 has the four positions 1921, 1922, 1923, 1924. As shown in FIG. 19, through the user interface game screen, the user can graphically interact with the 3D cube 1910, so as to rotate the 3D cube 1910 about the A and B axes to graphically display a set of the cube faces. In some embodiments, the user graphically chooses a subset of the displayed set of cube faces, thereby selecting the positions and associated risk units on the chosen subset of cube faces for use in playing the game. In some embodiments, the user selects individual positions on the display set of cube faces.

In the example of FIG. 19, the cube 1910 is rotated to graphically display three cube faces 1915, 1920, 1925, and the user graphically chooses, from among the three displayed faces, a group of two faces 1915, 1925. The 8 (2×2×2) positions 1911, 1912, 1913, 1914, 1921, 1922, 1923, 1924 on the chosen two faces 1915, 1925 are, thereby, selected for use in playing the game. In some embodiments, such selection of the positions is made prior to determination of fixed odds payout rewards. Each of these selected positions 1911, 1912, 1913, 1914, 1921, 1922, 1923, 1924 is configured with a risk unit of a matchup, toggle, or over-under, and a winning pick for that configured risk unit. In some embodiments, for each selected position, the user interface game screen is displayed with a set of matchups from which the user may select one of the matchups to assign to that position. In other embodiments, the platform uses a random or algorithmic method for selection of the risk unit for each position of the chosen cube faces 1915, 1925.

In some embodiments, the cube 1910 is made up of independently rotatable sections, in the manner of a Rubik's cube, it could also be shown as a 2×2×2 cube of 8 blocks, each block being a risk unit. This allows the user to organize positions and thus the risk units by virtually rotating one or more of the independently rotatable faces. This game too has fixed odds payouts and dynamic fixed odds payouts.

Figure 32E:
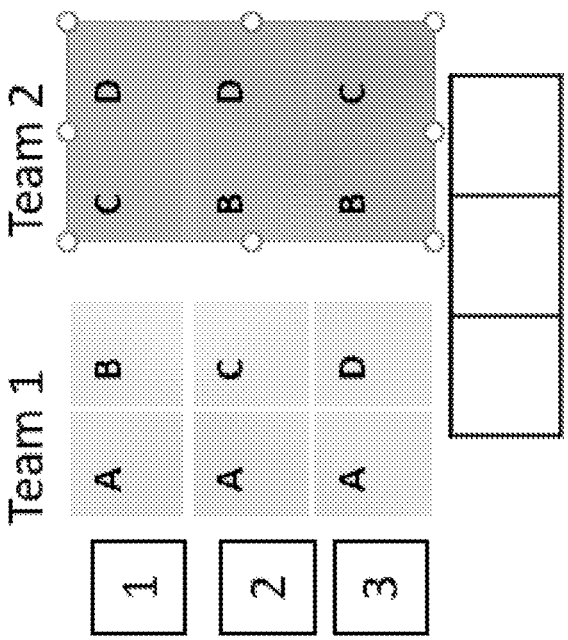
Figure 32D:
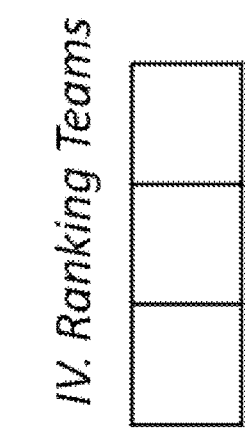

FIG. 32 shows an embodiment in which games of skill involve the ranking of two or more participants in combination. In this embodiment, each game has a reward specified as fixed odds, progressive fixed odds, variable fixed odds, and variable progressive fixed odds. In game I of FIG. 32 a ranking game of four players is shown in a 1×4 array. Game II depicts a sample selection of over-unders. Each over-under combines two of the 4 participants A, B, C, and D. A user may then select over or under for the set lines of each pair of participants. In this embodiment of four participants, there are six over-unders to choose from. In some embodiments the payouts are based on fixed odds for a certain number of correct selections. In one embodiment the user selects how many correct selections they will make, and get a fixed odds payout based on that number, granting higher payouts for more successful picks.

FIG. 32 game III shows a matchup of two participants versus another two participants. For 4 participants there are three matchups. In some embodiments each participant may be weighted differently in different matchups. In another embodiment each participant has a different criteria for achieving a certain fantasy score from matchup to matchup. Game IV is a ranking game based off of game III allowing each of the groups of participants to be ranked by how much they beat the other group by. In some embodiments the platform calculates the chances of each selection relating to each other (for example, if participant A has a very high fantasy score, it is likely that the groups having participant A will all win) and calculates the fixed odds payouts based on these relations.

In embodiments of games shown in FIG. 32, the fantasy scores of participants A, B, C, and D are based off of a qualification and a time. For example, a participant requires a certain amount of time of riding a bull to qualify for a score, and then the score is based off the time ridden above said qualifying time.

In an embodiment the game a number of contestants are entered and after a qualification event, a further over-under is selected. A reward winning pattern may be found for users who correctly select qualifying participants and make winning selections in the following over-under. In one embodiment of a rodeo based game the wager selects three rider/bull pairs and an over-under on each pair. The over-under may be based on the rider's score or the combined rider and bull score. A user wins if they correctly select at least 2 riders who make their eight.

The user would receive higher payouts for selecting three riders who make their 8. The user may then get a higher payout for each over-under they correctly select. In one embodiment a user who pays one unit will receive 5 units if two of their 3 riders make the 8. If said user selected three riders who made their 8 that user would receive 15 units if they selected 0 over-unders correct; 40 units for selecting one over-under correct, 85 units for selecting two over-unders correct, and 350 units for selection all three over-unders correct. In this embodiment the platform has calculated the odds based upon an approximate ⅙ probability that any rider will make their 8, an approximate ½ probability of selecting a correct over-under, and a probabilistic return of 9.97%. The platform can adjust the fixed odds payout schedule based on changes in any of these numbers.

In some embodiments, such as the fixed odds payout schedule above, the payouts are of relatively large orders of magnitude, e.g. 350:1. Therefore, it is advantageous in these embodiments to have a large number of wagers, e.g. 1,000 to obtain reasonable downside protection.

In other embodiments, the game may not require over-under selections. Instead, the user selects N riders, and receives a fixed odds payout based on the number of selected riders who make the eight.

In other embodiments, the game may require the user to select two riders to make the eight and respective over-unders. This embodiment may require at least one of the riders to make the eight to receive a prize, but offer less payouts than selection two out of three.

Event Bingo Games

Class II games under 25 C.F.R. § 547 provide popular Native American gaming activities. Predominant in this category are games based on bingo cards, i.e. a random number output in an array format. Event bingo games integrate a component based on fantasy sports scoring with various random number generation and random event generation schemes. Event bingo games provide added excitement for sport's fan and gaming enthusiasts while maintaining compatibility with the technical requirements of class II games.

Any array choice game can be configured as an event bingo game by computer processes involving random number generation (RNG) and random event generation (REG). As for the skill based games previously discussed, each array, or "bingo card" is associated with a set of geometrically confined positions, each position further being associated with a risk unit, and each risk unit being associated with a set of potential winners. A key difference between the pure skill based games and the event bingo games is that each potential winner is further associated with a set of random numbers, determined by RNG. In some embodiments, events can also be randomly generated by a process of REG.

Figure 5:
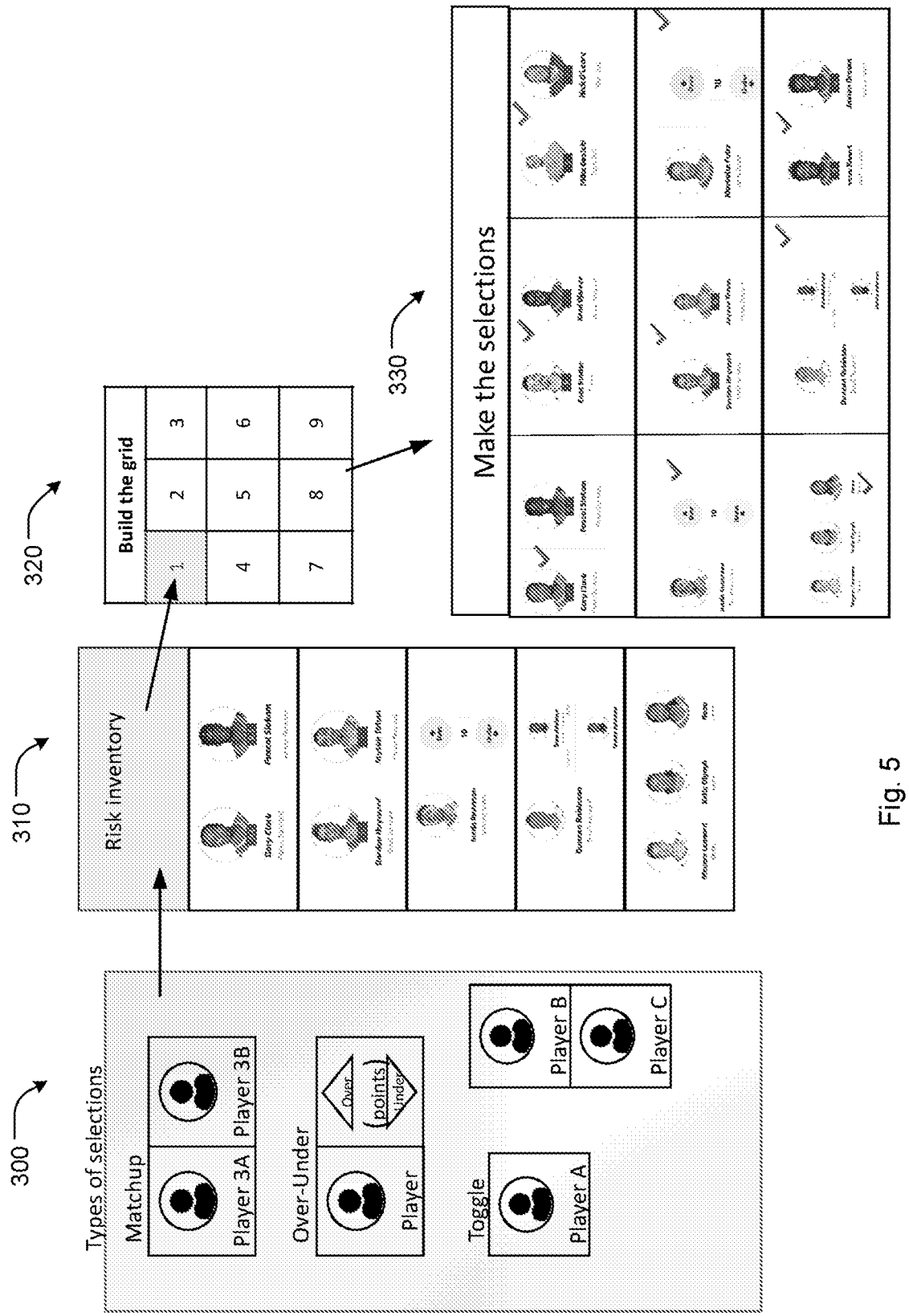
FIG. 5 shows some common features of array based games embodied in this disclosure.

As summarized in FIG. 5, for preferred embodiments, the activity server system prepares an event selection schedule 300. Based on that schedule, a risk inventory 310 is provided for the user, based on the user's profile, or on random selection processes, or on a combination of the two. Risk units are selected from the risk inventory for placement in an array 320 by the user or by the activity server system, depending on the type of game. Each selected risk unit is then assigned to exactly one position in the array, with exactly one risk unit per position, by the user or by the activity server system, depending on the type of game. Each potential winner of each selected risk unit is assigned a random number. The pool of random numbers available to each potential winner does not overlap with any other potential winner. A projected winner is then determined for each risk unit. In some embodiments the projected winner for each risk unit is selected by the user. In some embodiments the projected winner is randomly selected by the computer. Winning selections are determined by matching the projected winners to actual winners as determined by real events. When it is determined that the projected winner is an actual winner, that position of the array is marked, i.e. covered by the electronically generated RNG. Rewards may be awarded to the users to have a preset pattern or amount of marks. In some embodiments, additional prizes may be awarded based on matching of winners with patterns, such as a reward winning pattern, or on matching some number of winners and random numbers.

In some such embodiments, as summarized in FIG. 6, the computer generates a risk inventory based on customer profiles, which include predicted customer preferences (FIGS. 7-13). Such preferences may be determined by algorithmic or machine learning processes based on user history, geographical information or on user-provided preferences for athletes, teams, horses, trainers, and the like.

Figure 7:
FIG. 7 embodies array-based games for which the computer generates and arranges event-based risk units in an array based on a set of rules, and selects a prospective winner for each risk unit based on further rules.
Figure 8:
FIG. 8 embodies array-based games for which the computer generates and arranges event-based risk units based on a set of rules, and customer chooses a prospective winner for each risk unit.
Figure 9:
FIG. 9 embodies array-based games for which the computer generates the events based on a set of rules, and for which the customer arranges the risk units in the array and chooses a prospective winner for each risk unit.

Based on these preferences, in some embodiments the computer builds an array and selects projected winners within the array (FIG. 7). In some embodiments, the computer builds an array and the customer selects projected winners within the array (FIG. 8). In still other embodiments, the customer selects from the computer-provided risk inventory to build the array, and the customer selects projected winners within the array (FIG. 9).

Figure 10:
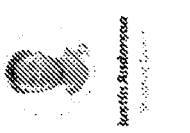
FIG. 10 embodies array-based games for which the computer randomly generates an array of risk units and randomly selects potential winners for each risk unit (slots).
Figure 11:
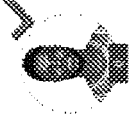
FIG. 11 embodies array-based games for which the computer randomly generates an array of risk units, and customer selects potential winners within the array.
Figure 12:
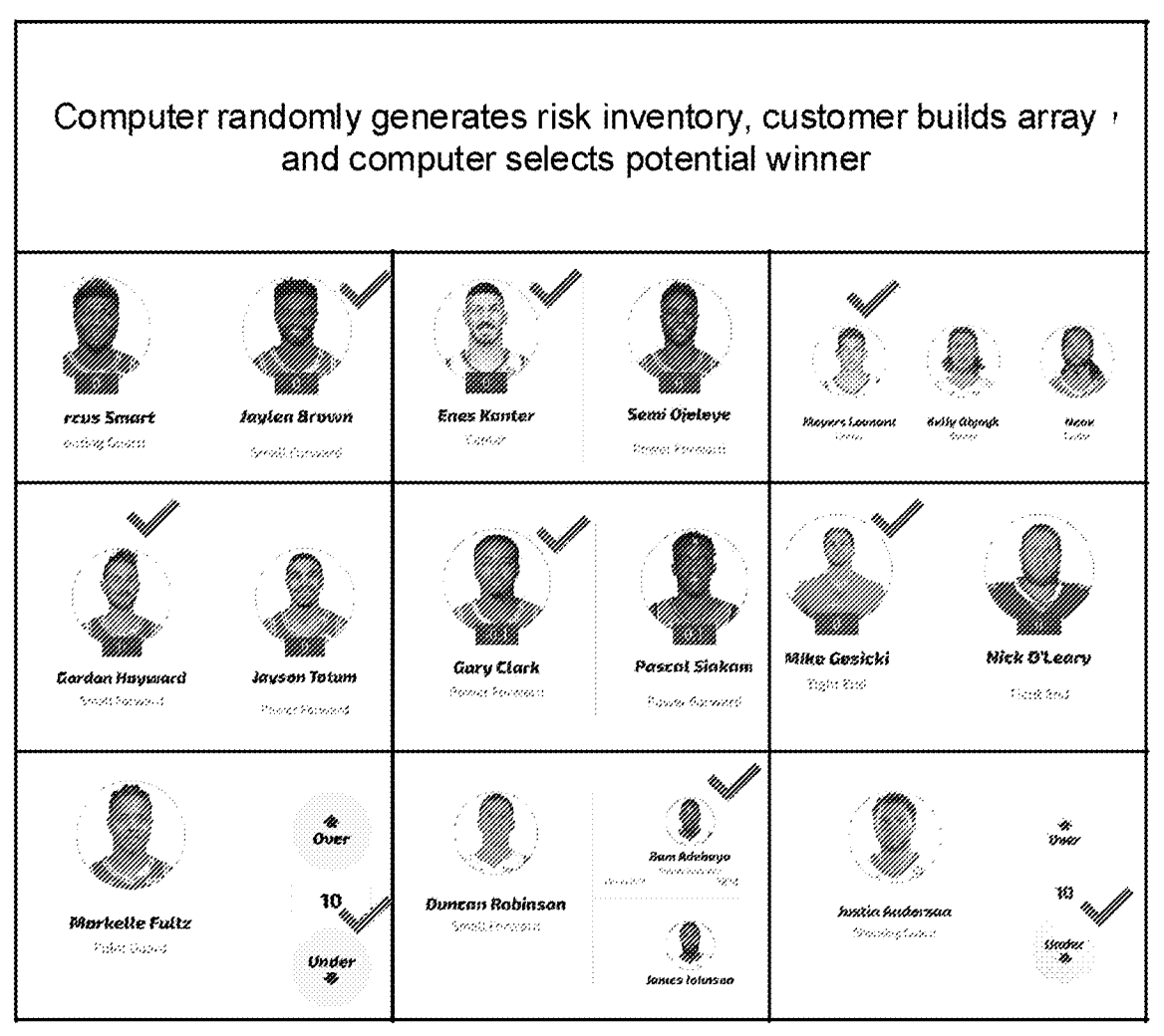
Figure 13:
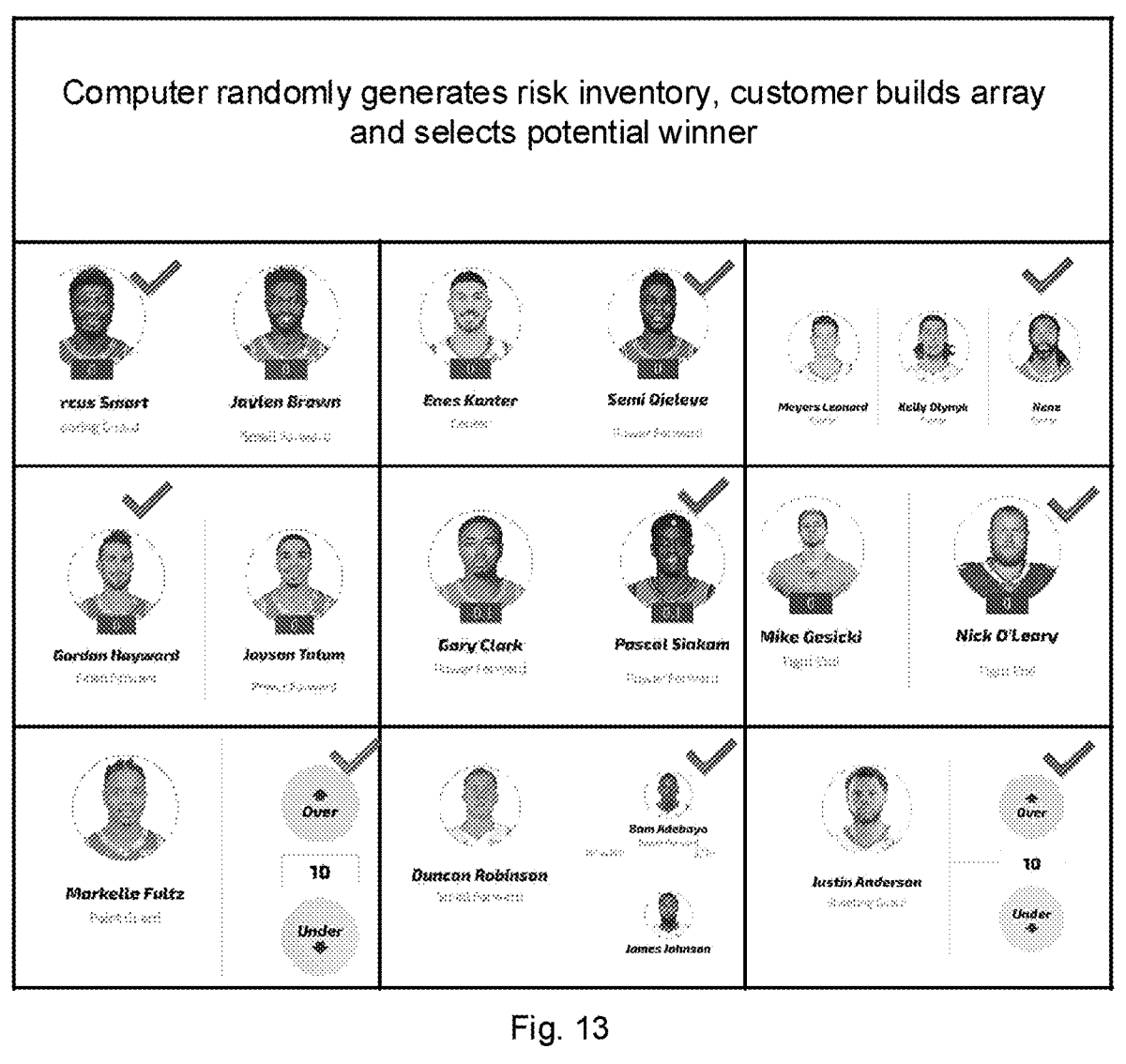
Figure 14:
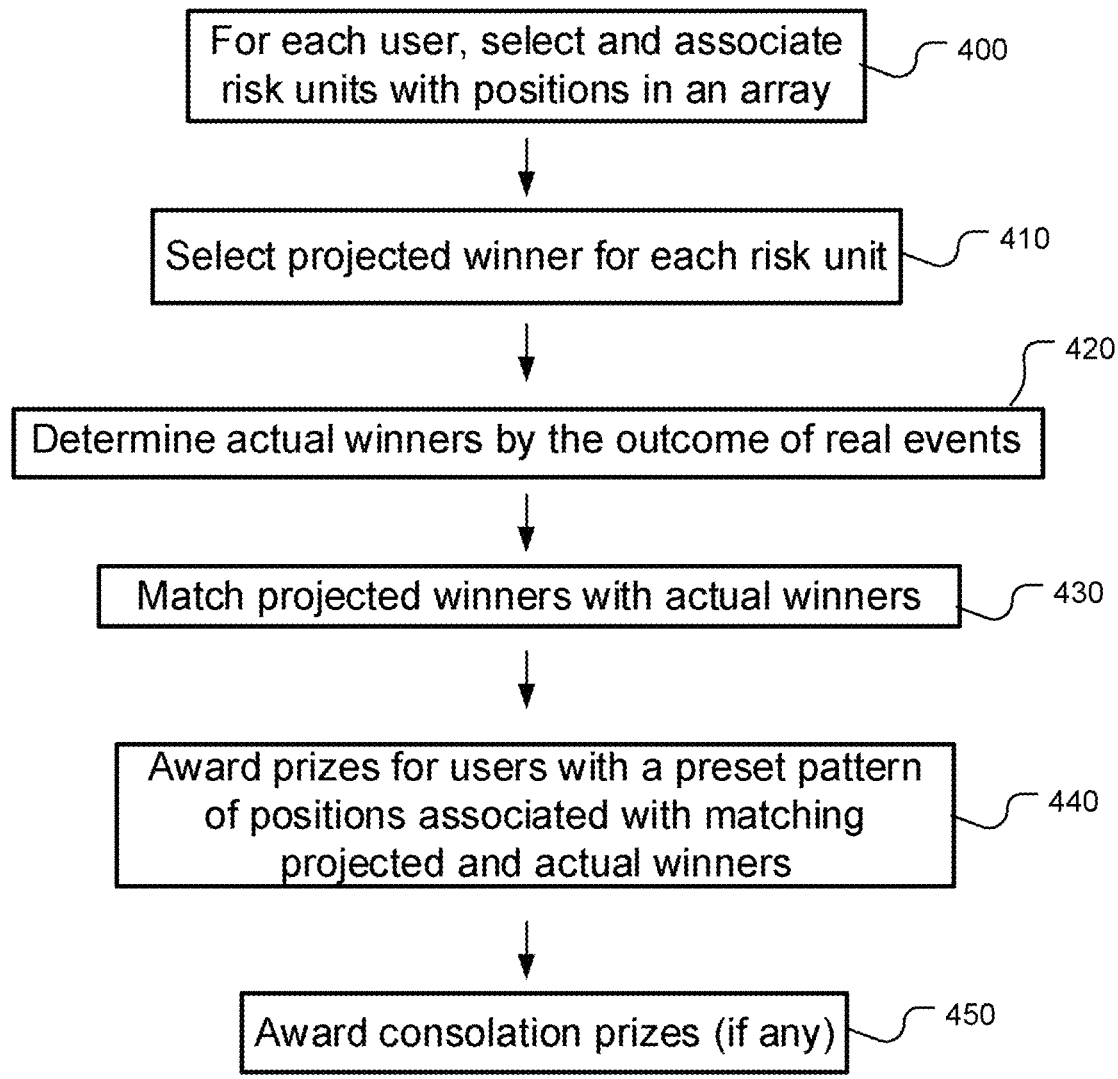
FIG. 14 summarizes array-based games of skill according to embodiments of the instant invention.
Figure 15:
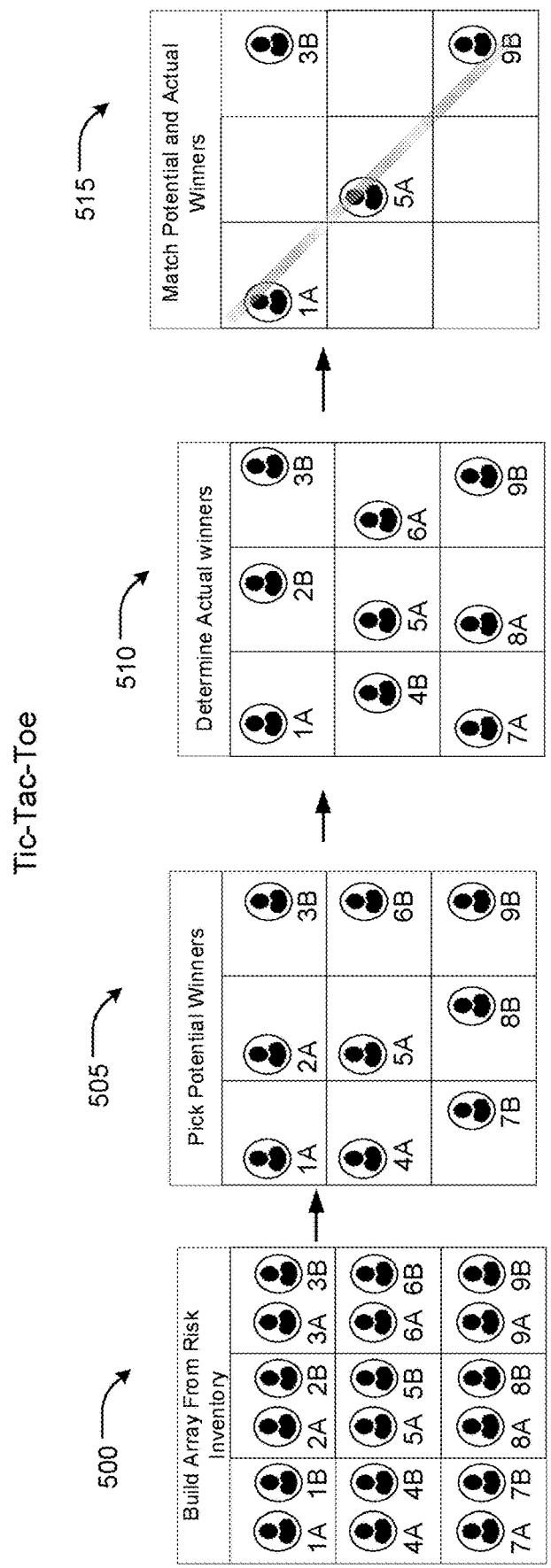
FIG. 15 embodies a skill-based game of tic-tac-toe according to embodiments of the instant invention.

In some embodiments, the risk inventory of risk units is generated randomly (FIGS. 10-13). Based on these random selections, in some embodiments the computer builds an array and selects projected winners in the array, analogous to a game of slots (FIG. 10). In some embodiments, the computer builds an array and the customer selects projected winners within the array, analogous to keno (FIG. 11). In some embodiments, the customer selects from the computer-provided risk inventory to build the array, and the computer selects projected winners (FIG. 12). In still other embodiments, the customer selects from the computer-provided risk inventory to build the array, and the customer selects projected winners within the array (FIG. 13).

Figure 20:
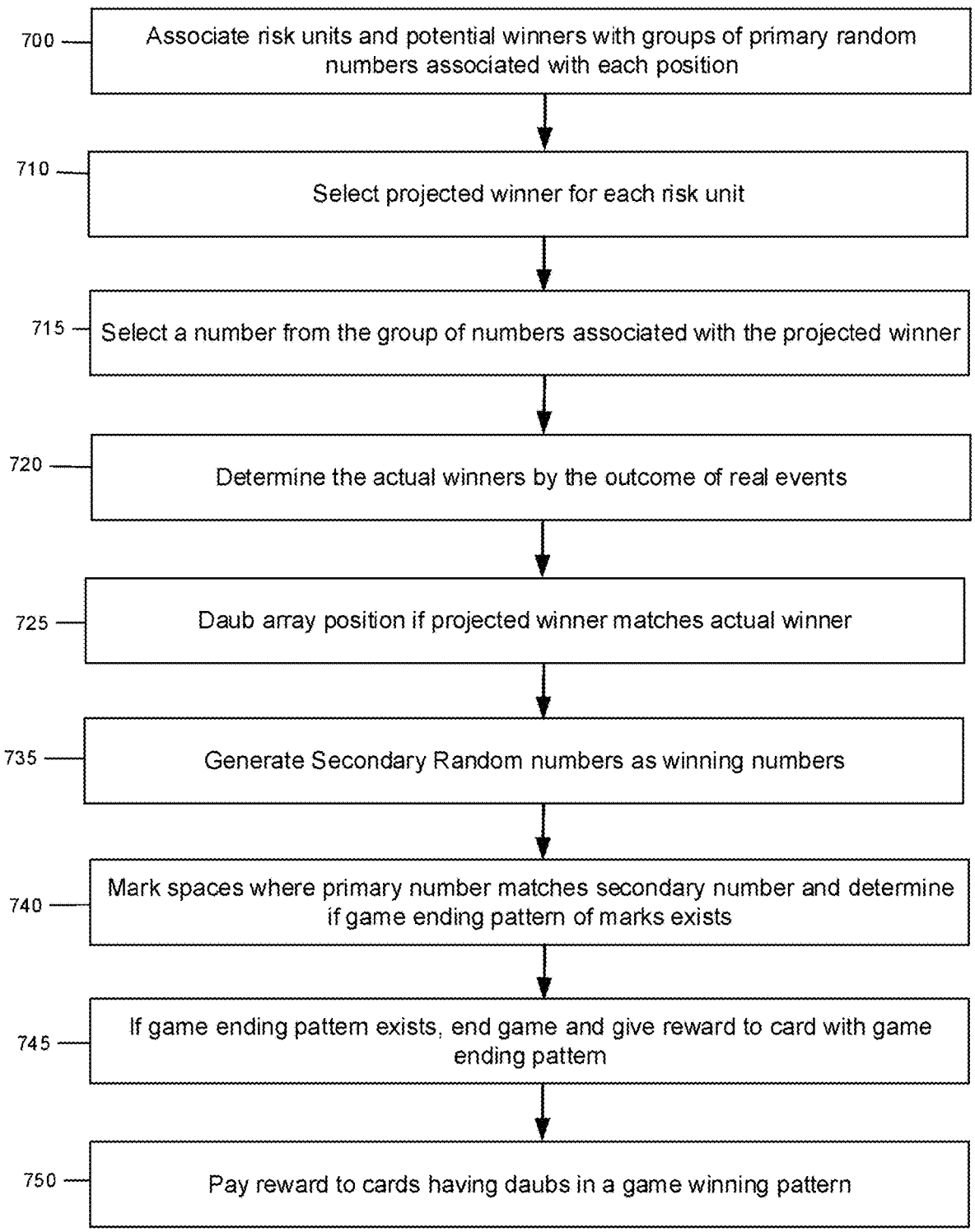
FIG. 20 shows a flowchart summarizing steps in a micro bingo game.

One embodiment of a process for creating an event bingo game is shown in FIG. 20. In step 700 primary random numbers are associated with array positions. There are a set of groups of numbers which are assigned to a potential winner of a risk unit. The numbers may be in three or more groups for a toggle event or other three or more way event. In step 710 a user or the activity server may select a projected winner for each risk unit. The user may select the projected winner based on a skill or knowledge that the user has. The activity server may select the projected winner randomly. When the projected winner is selected in step 715 a number from a group of numbers associated with said projected winner is assigned to the same array position as the projected winner. In step 720 a prized set (often referred to as interim prize) are determined by the correct selections of a real event. In some embodiments the event is a sports game, awards show, political race, random number generator, or other event. In step 725, the array positions where the projected winner is the actual winner are marked. A mark may be a virtual or physical marking. In step 735, a Bingo game is played such that secondary random numbers are generated as winning numbers. These secondary random numbers are matched against the random numbers associated with the events in the card set. If the secondary random numbers match those associated with the events in the card set, the position is daubed. The secondary random numbers may only be matched against numbers associated actual winners. In step 740, the bingo card that is makes a game ending pattern of daubs is considered the winning bingo card. In some embodiments, the secondary random numbers may be redrawn a plurality of times to provide at least one winner. In other embodiments the secondary random numbers may be redrawn until each bingo card having a reward winning pattern of marks also has a game ending pattern of daubs. In some embodiments, once a winning bingo card is determined the game is over. Further rewards, sometimes called continuation or bonus prizes or awards, may be assigned for entries associated with correctly selected patterns based on the game type regardless of achieving the game ending pattern associated with the bingo RNG. In step 745, rewards are awarded to the bingo card having the game ending pattern. These rewards may be money, tokens, discounts, nominal, and any other prize. Once rewards for the winning bingo cards are doled out, bingo cards that have a reward winning pattern from step 730 are paid out in step 750. In some embodiments this may be redundant, as each card with a reward winning pattern will have a game ending pattern, thus the reward may be the same for both. The reward for the reward winning pattern is a fixed odds payout which the activity server determines. The activity server may calculate all the possible winning patterns and associate different or identical fixed odds for each pattern such that the odds of a payout are at a specified value.

Figure 21:
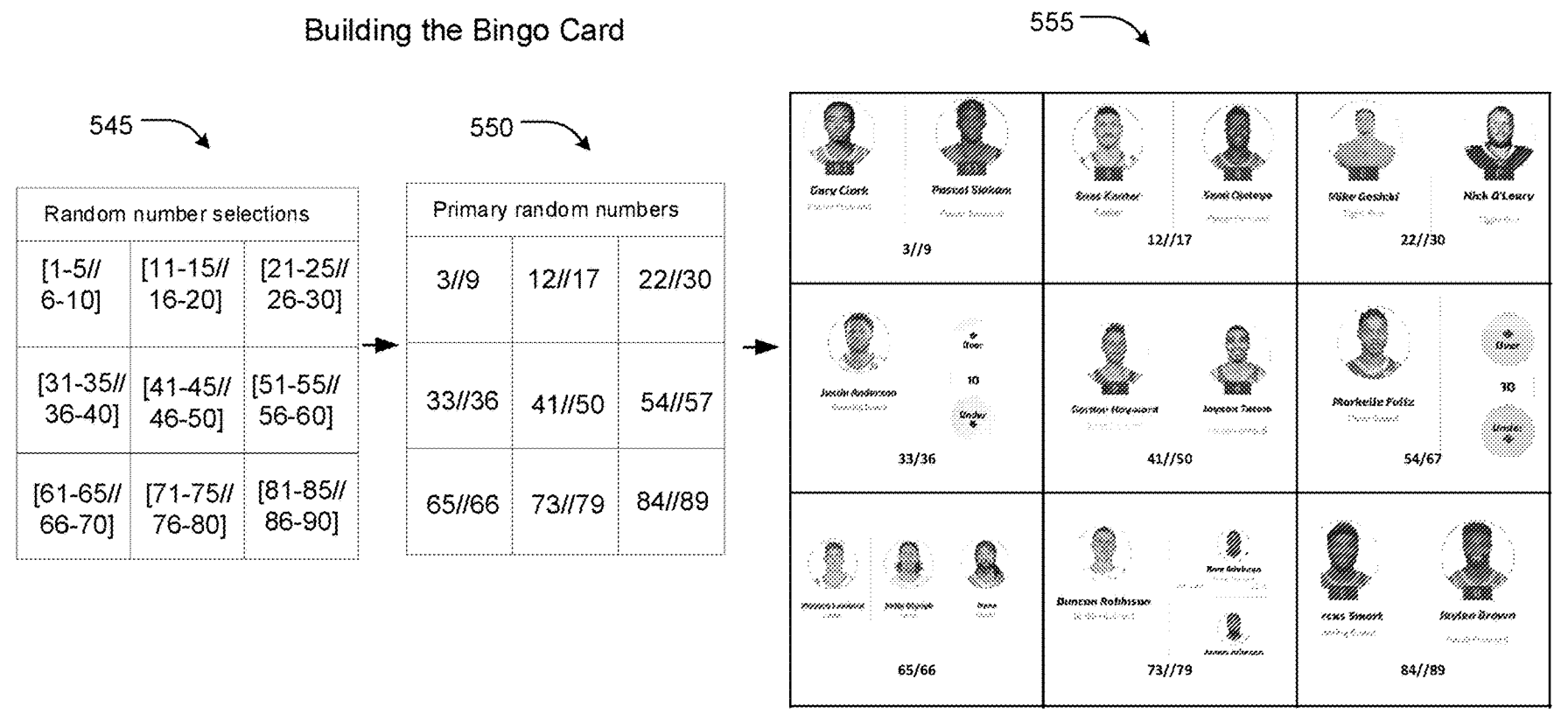
Figure 22:
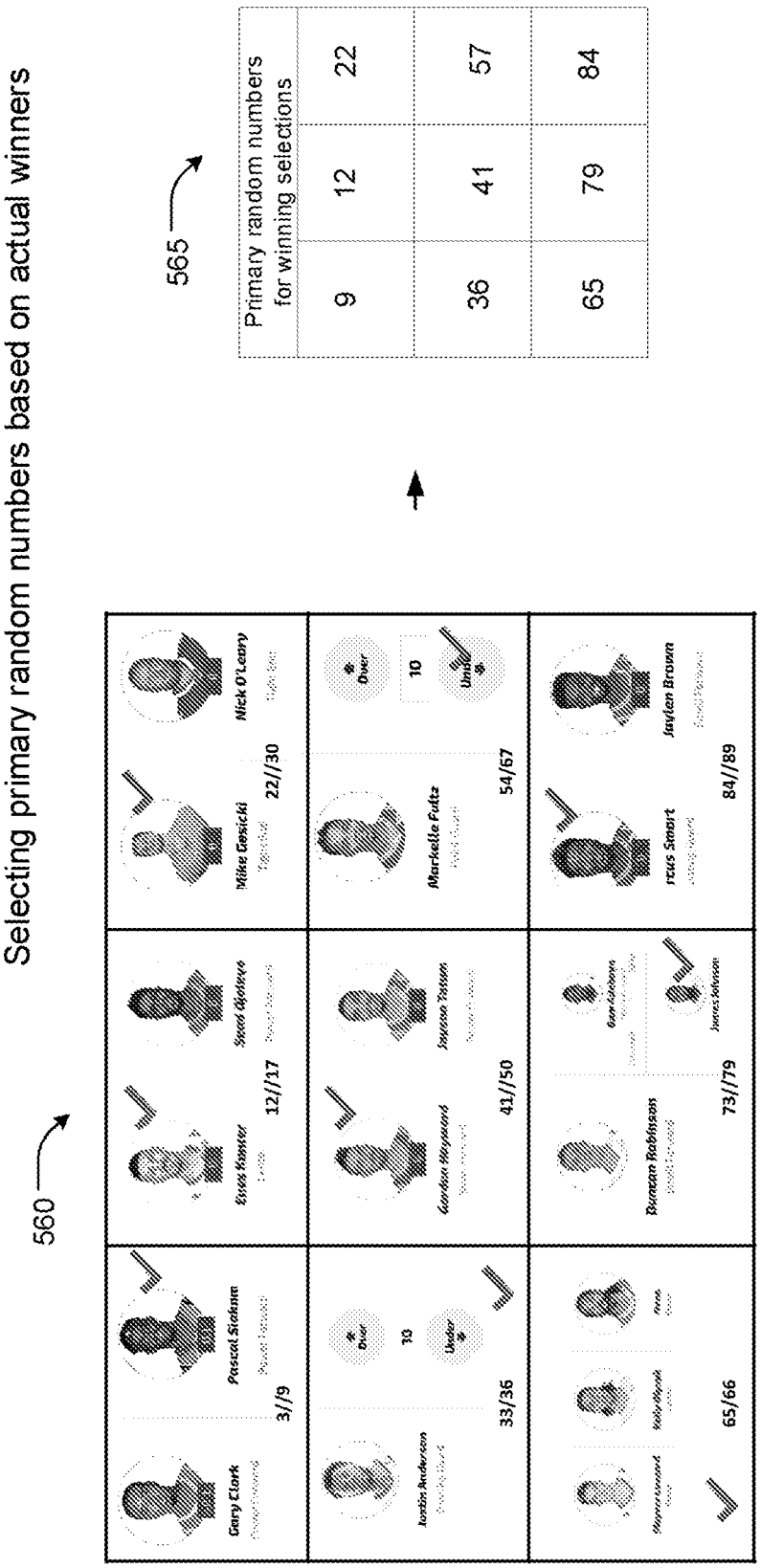
FIG. 22 shows a first "ball-drop" for actual winners for each risk unit of the micro bingo card are chosen, as determined by real-world events. Primary numbers corresponding to the actual winners then are associated with each position on the micro bingo card.
Figure 23:
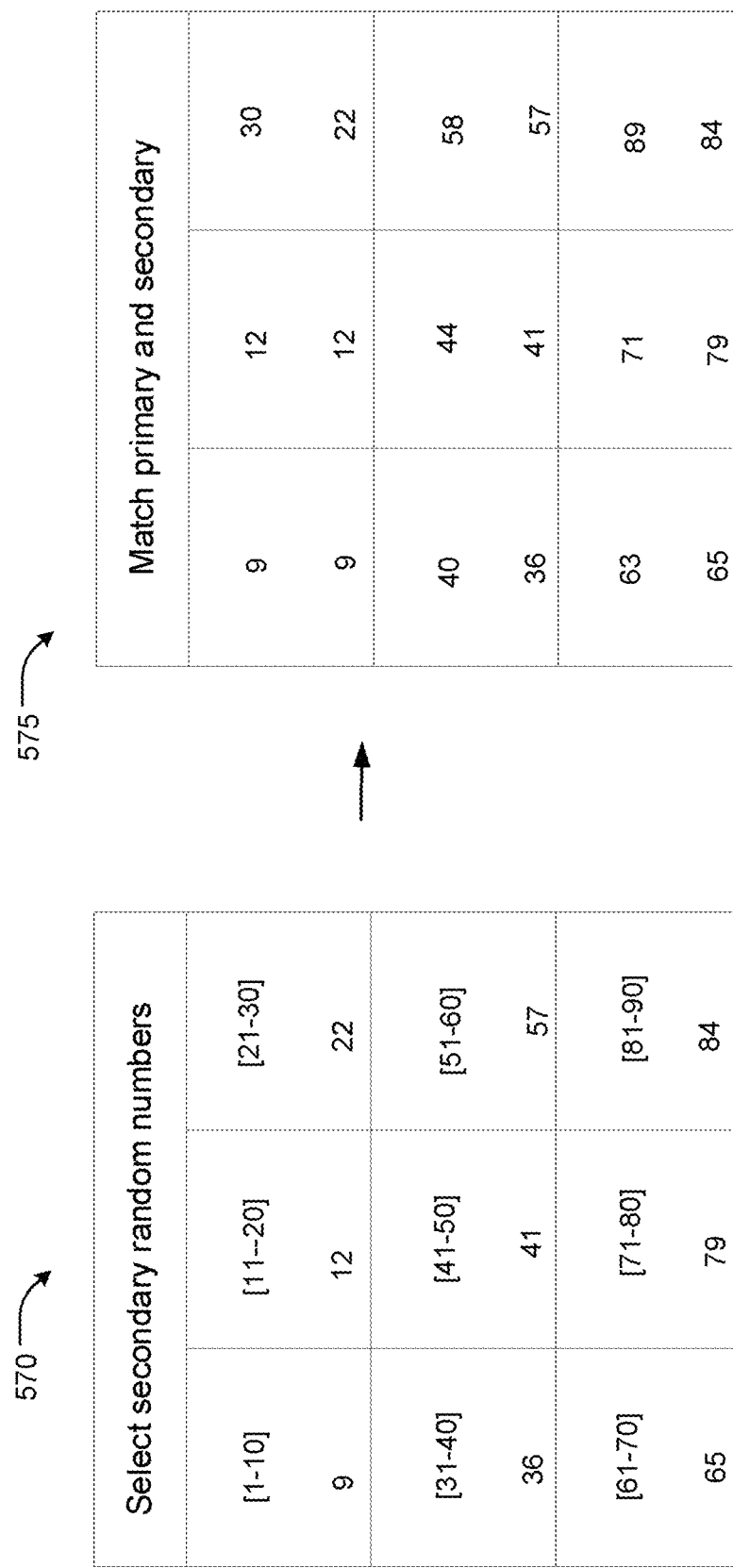
FIG. 23 shows a second "ball-drop" for which each position on the micro bingo card is further associated with a second integer, chosen from the same randomly selected pools as the first integer. For each position, first and second integers are compared, and a winning card is declared as the first card with matching numbers in the correct game-ending pattern. If no matching of numbers gives the game ending pattern, and then further selections of second integers are made, until a winning card occurs.

A specific embodiment of a general process for building and matching an event bingo card is described in FIGS. 21-23. FIG. 21 exemplifies how a 3×3 bingo card is built and matched. Initially, the bingo card 545 is built where each position on the card is associated with a specific risk unit, selected randomly, or based on specific customer preferences. Each risk unit has a pool of random number selections associated therewith. The bingo card 550 has a random number from each group of random number selections selected. The bingo card 555 then has a risk unit associated with each array position and thus each potential winner has a unique random number associated therewith.

In FIG. 22 the bingo card 560 is played by the user or activity server by selecting a projected winner for each risk unit on the bingo card. Therefore, each array position now has a single random number associated therewith as shown on card 565.

As the events take place, the actual winners are determined and the played bingo card is compared with the actual winners and the bingo card is marked where the projected winner is the actual winner. A first pattern may be a horizontal, vertical, or diagonal line being three units long. In this case, the bingo card has achieved a first pattern having a diagonal line from the top left to the bottom right of the card. In some embodiments this first pattern may have a specific fixed odds payout associated with it, which would pay out based on how much the user paid for the bingo card. In some embodiments only the cards containing the first pattern may move onto a second game. In other embodiments both cards having a first pattern and those without a first pattern may move onto a second game. In other embodiments cards not having a first pattern will move onto a second game. In some embodiments there may be different requirements to move onto the second game e.g. having a specified number of marks.

The second game is shown in FIG. 23. The second game may run in parallel with the first game or at a different time, such as right after the last actual event takes place. In card 570, each array position has a secondary number assigned to it. In some embodiments where the numbers may be assigned not in order, the secondary numbers may be drawn without an assigned array position. In some embodiments, when a user or the activity server makes a selection of a projected winner, a random number from the pool of number associated with that projected winner is assigned to that space. In other embodiments, for each bingo card a random number from each pool of numbers associated with a potential winner is assigned to the array section before the projected winner is chosen. The secondary numbers shown in card 570 are then compared to the primary number 575. In some embodiments only primary numbers associated with winning selections are compared. The primary and secondary numbers are then compared as shown on card 575 to determine if a Bingo card has a game ending pattern and is thus, a winning Bingo card. The winning bingo card may be the first bingo card to obtain a game ending pattern. If there is no game ending pattern such as shown in card a new set of secondary numbers may be chosen, or a new game ending pattern may be chosen. The game ending pattern in the second game may be different than the reward winning pattern in the first game. Once a bingo card is known to have a game ending pattern the game is ended and prizes are awarded. Prizes may or may not be given out for having the game ending pattern for the second game. In some embodiments prizes are given out for reward winning patterns.

Figure 25:
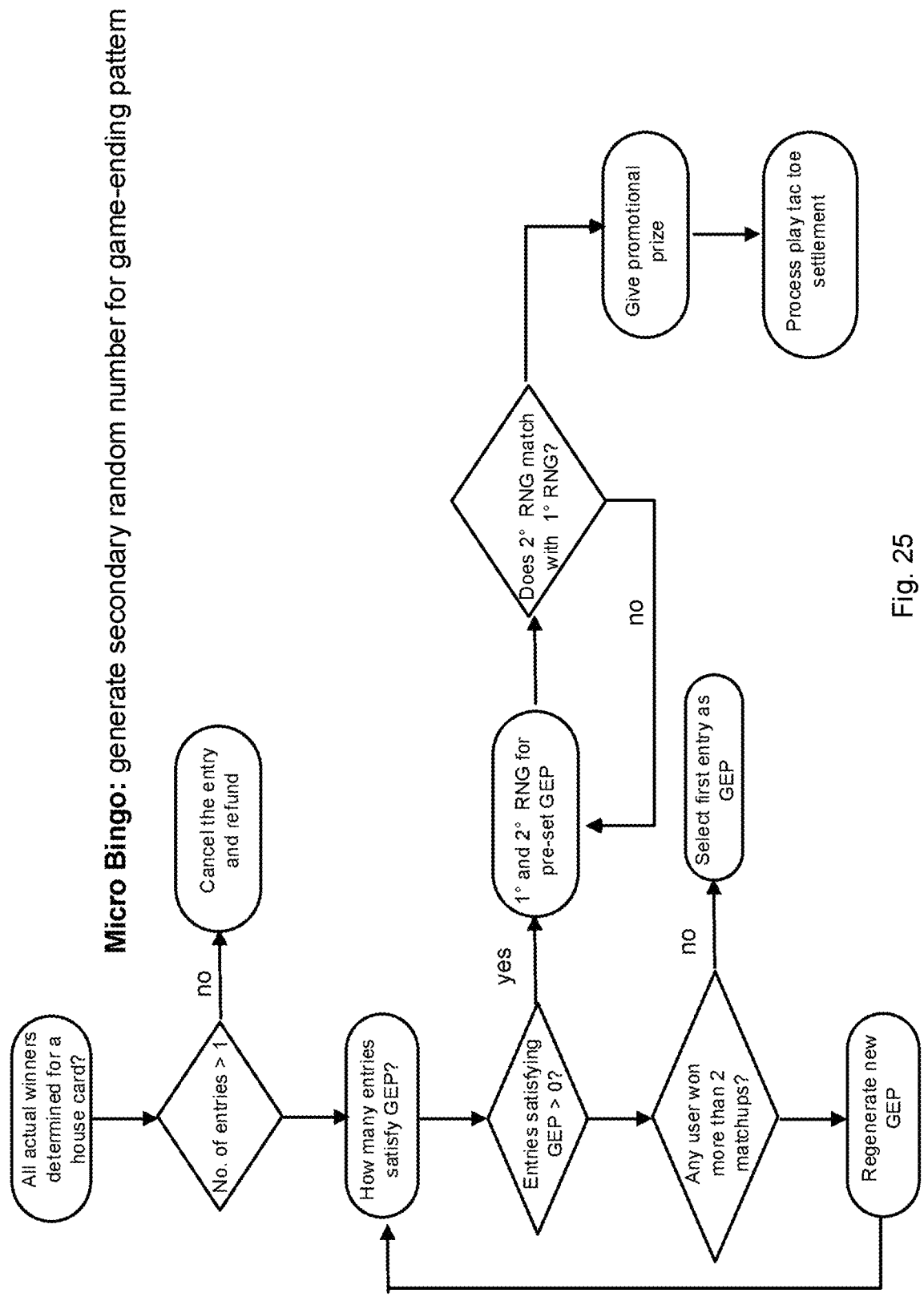
FIG. 25 shows a flow chart of a micro bingo game according to an embodiment of the instant invention.

FIG. 25 provides a flow chart outlining an exemplary embodiment of a process for determining a winning bingo card. The process is designed to ensure that, for each game with more than one player, there is a winning bingo card. If the number of entries is less than one, then the entry is canceled and the user has her money refunded. If the number of entries is greater than one, then the activity server detects how many entries have the first pattern. If the number of entries with the first pattern on their bingo cards is also greater than one, then secondary random numbers are generated. The first bingo card to match the game ending pattern with their daubed array sections is declared the winning bingo card. If no bingo card provides the game ending pattern of daubed array sections, then secondary random numbers are again generated until a game ending pattern of daubed array sections is obtained. In some embodiments the secondary random numbers are again generated until each entrant having a reward winning pattern has a game ending pattern. In further embodiments, the secondary random numbers are generated until each random number associated with each risk unit has been selected, thereby all permutations of correctly selected reward winning patterns have a game ending pattern. In an even further embodiment the reward winning pattern is the same as the game ending pattern.

If on the other hand no card has a pattern of daubs that matches the game-ending pattern, then a new game ending pattern is generated and checked for a game ending pattern of winning matches. This process continues until a game ending pattern of winning matches is found. For example, the original game ending pattern may be a line of three, but if no card has a pattern that matches a line of three, the system would instead look for a line of two. Once the game ending pattern of matches is found, then secondary random numbers are generated as described above until a winning bingo card is obtained.

Once the game has ended, the prizes are awarded. In some embodiments prizes are awarded for achieving the first pattern, the game ending pattern, the reward winning pattern, and other patterns. Small consolation prizes may also be awarded, e.g. for obtaining a given pattern of matches or a given number of winning selections.

In various embodiments prizes are awarded by applying a random number generator to correctly selected risk units, until each correctly selected risk unit associated with the event is matched with a correct random number generator of the prize ending pattern. This can be run in sequence or also run randomly. Such prizes are interim, continuation, consolation and bonus prizes. In some embodiments, the potential winners do not have a common prize set, such as the embodiment shown in FIG. 33. In these embodiments the fixed odds payout would be given to the user based on the selections made.

Figure 24:
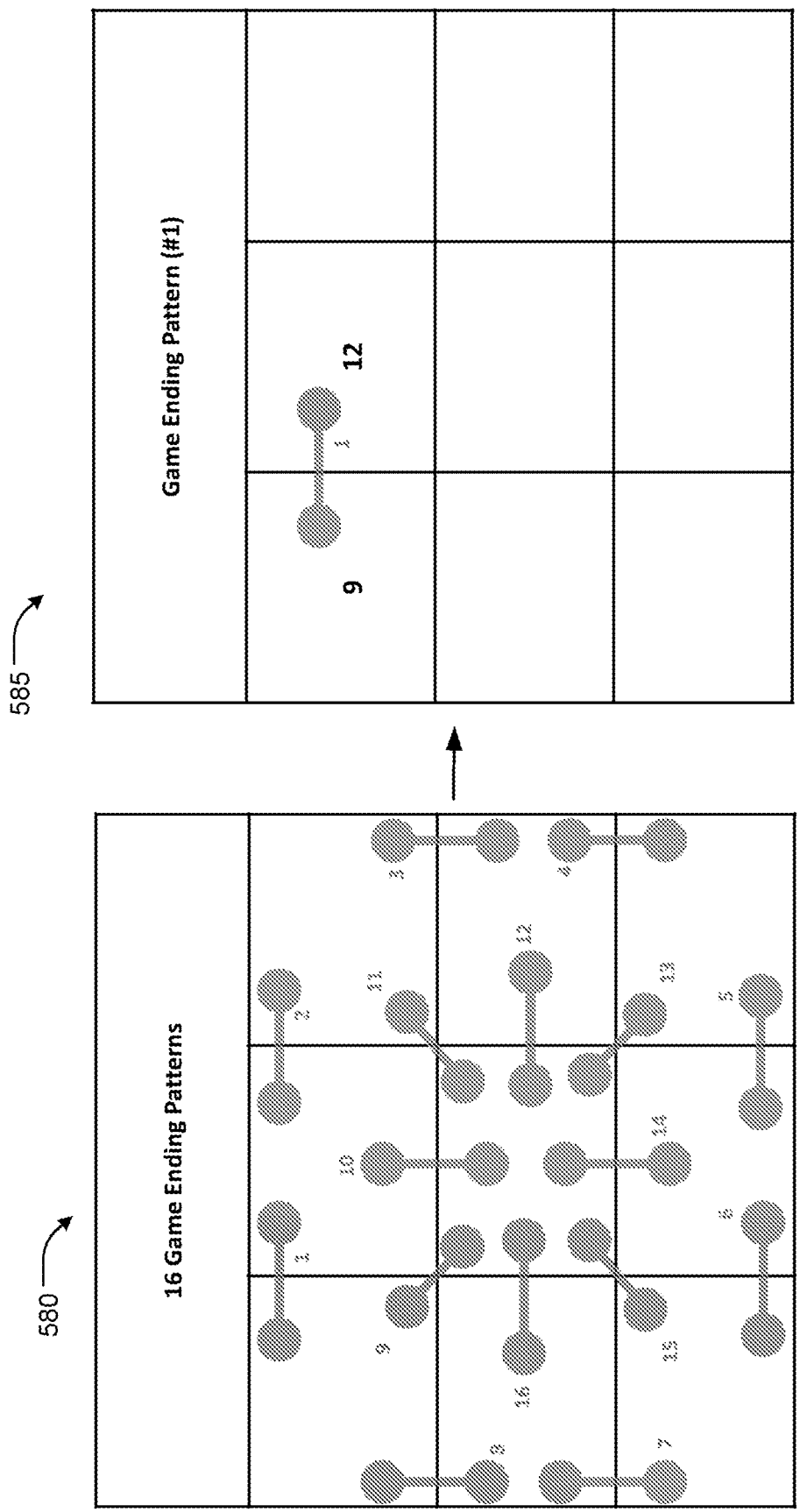
FIG. 24 shows the sixteen potential game ending patterns involving two neighboring positions on the micro bingo card. In this example, the primary and secondary random numbers of FIG. 25 match for game-ending pattern #1

FIG. 24 shows a game ending pattern of having two neighboring daubs. There are 16 different ways to arrive at this simple game ending pattern. In another embodiment the game ending pattern is 2 daubs that do not need to be adjacent.

Numerous variations and modifications based on the determination of daubs and marks will be apparent to those skilled in the art. All such variations and modifications are intended to be within the scope of the present invention as defined in any appended claims.

Figure 26:
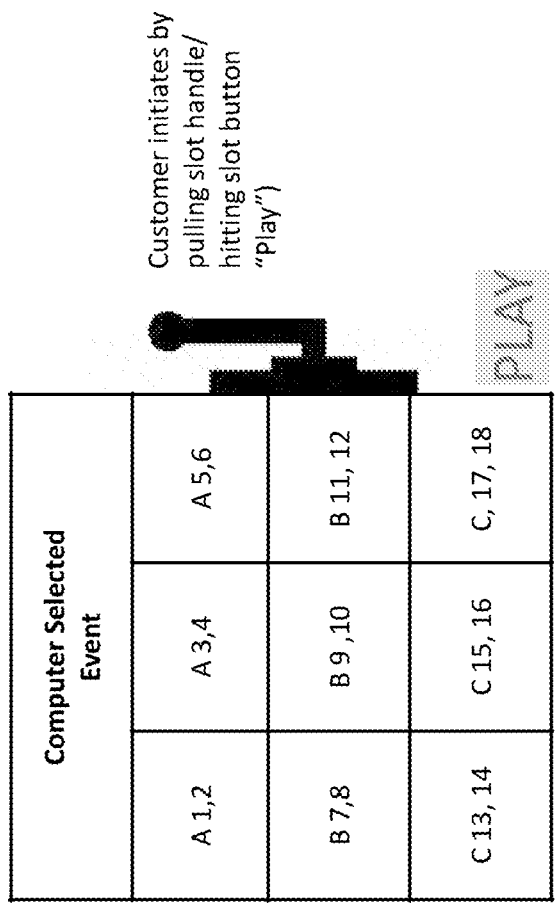
FIG. 26 is a micro bingo game configured as a slot machine, where the customer initiates machine processes that select events and potential winners and compares potential winners to actual winners according to event bingo rules.

Among such variations, are slot-machine type games, which involve purely random choices made by the computer, where the user interacts with the slot machine to initiate the random choices (e.g. by pulling a lever), which institutes random processes of array generation and random selection as shown in FIG. 26. Similarly to matching the potential winners to a pool of numbers in the array, the slot machine may have a set of reel possibilities related to each potential winner. The reel possibilities may overlap with each potential winner. When the actual winner is determined the slot machine may generate a random reel possibility for the actual winner. In some embodiments the reel may look like a 3×3 array such as the one showed in FIG. 25. Each row may be classified as A, B, or C. Each array section may display 1 reel possibilities and payout based on having a set of a particular reel possibility appear in the row. Each array section may determine an actual winner from a different event or some array sections may determine the actual winner from the same game. The activity server may decide payouts based on the possibilities of a winning set of reel possibilities appearing.

What is claimed is:

1. A non-transitory storage medium storing instructions that, when executed by an activity server system, establish computer processes, wherein the activity server system communicates over a wide area network with a plurality of presentation devices, each distinct one of the presentation devices associated with a distinct one of a plurality of users, the computer processes comprising:
   receiving from each of the presentation devices user profile data including user validation information;
   validating the user profile data to determine user eligibility to play a proffered advanced choice game;
   serving, to each validated presentation device of each eligible user, a corresponding game card having a plurality of risk units selected from a risk inventory, each risk unit having at least two potential winners and an association with a position on the game card, wherein at least one risk unit is a non-unique risk unit, which has at least two potential winners having different chances of winning;
   determining a set of reward winning patterns;
   for each risk unit, choosing a projected winner from the at least two potential winners therein;
   determining a fixed odds payout for each of the set of reward winning patterns, based on which projected winner is selected, the fixed odds payout being based on the chances of winning and not on bets of other users;
   for each risk unit, determining, based on an outcome of a set of actual events, which potential winner is an actual winner;
   daubing all positions for each game card for which actual winners match projected winners;
   determining if each game card has at least one reward winning pattern based on daubed positions, and identifying a user having such game card; and
   dispensing the fixed odds payout to the user having the reward winning pattern.

2. The storage medium of claim 1 wherein determining the fixed odds payout includes determining the fixed odds payout based on a desired margin.

3. The storage medium of claim 2 wherein determining the fixed odds payout based on the desired margin includes determining the desired margin based on an estimated volume of game card sales.

4. The storage medium of claim 1 wherein determining the fixed odds payout includes determining the fixed odds payout separately for each presentation device.

5. The storage medium of claim 4 wherein determining the fixed odds payout separately for each presentation device further includes determining the fixed odds payout separately for each such presentation device based on a history of success of such presentation device.

6. The storage medium of claim 1 wherein serving the corresponding game card further includes configuring the corresponding game card for playing a skill-based game.

7. The storage medium of claim 1 wherein serving the corresponding game card further includes configuring the corresponding game card for playing a chance-based game.

8. The storage medium of claim 6, wherein the computer processes further comprise determining a venue associated with each of the presentation devices and wherein configuring the corresponding game card for playing the skill-based game further includes determining if the venue of each respective presentation device so permits and otherwise prohibiting playing the skill-based game.

9. The storage medium of claim 7, wherein the computer processes further comprise determining a venue associated with each of the presentation devices and wherein configuring the corresponding game card for playing the chance-based game further includes determining if the venue of each respective presentation device so permits and otherwise prohibiting playing the chance-based game.

10. The storage medium of claim 1 wherein determining if each game card has at least one reward winning pattern further includes determining if the game card has a correct ranking, based on a marginal score, of the risk units.

11. The storage medium of claim 10 wherein determining if each game card has at least one reward winning pattern further includes determining if a participant of each risk unit is qualified.

12. The storage medium of claim 1 wherein determining the fixed odds payout for each of the reward winning patterns includes calculating the fixed odds payout based on a size of a sphere of outcomes so as to reduce a probability of a non-negative return.

13. The storage medium of claim 1, wherein determining the fixed odds payout is based on the projected winner.

14. The storage medium of claim 1, wherein for each risk unit, the choosing a projected winner from the at least two potential winners therein, is performed by the distinct one of the plurality of users.

15. The storage medium of claim 1, wherein for each risk unit, the choosing a projected winner from the at least two potential winners therein, is performed by the activity server system.

16. A system for providing an advanced choice game, the system comprising:
   at least one non-transitory storage medium storing machine-readable code; and at least one activity server system comprising a processor configured to execute the machine-readable code and to communicate over a wide area network with a plurality of presentation devices, each distinct one of the presentation computing devices associated with a distinct one of a plurality of users;

wherein the machine-readable code, when executed by the activity server system, causes performance of computer processes comprising:

receiving, from each of the presentation computing devices, user profile data including user validation information;

validating the user profile data to determine user eligibility to play a proffered advanced choice game;

serving, to each validated presentation device of each eligible user, a corresponding game card having a plurality of risk units selected from a risk inventory, each risk unit having at least two potential winners and an association with a position on the game card, wherein at least one risk unit is a non-unique risk unit, which has at least two potential winners having different chances of winning;

determining a set of reward winning patterns;

for each risk unit, choosing a projected winner from the at least two potential winners therein;

determining a fixed odds payout for each of the set of reward winning patterns, based on which projected winner is selected, the fixed odds payout being based on the chances of winning and not on bets of other users;

for each risk unit, determining, based on an outcome of a set of actual events, which potential winner is an actual winner;

daubing all positions for each game card for which actual winners match projected winners;

determining if each game card has at least one reward winning pattern based on daubed positions, and identifying a user having such game card; and dispensing the fixed odds payout to the user having the reward winning pattern.

17. The system of claim 16, wherein determining the fixed odds payout includes determining the fixed odds payout based on a desired margin.

18. The system of claim 17, wherein determining the fixed odds payout based on the desired margin includes determining the desired margin based on an estimated volume of game card sales.

19. The storage medium of claim 16, wherein determining the fixed odds payout includes determining the fixed odds payout separately for each presentation device.

20. The storage medium of claim 16, wherein determining the fixed odds payout is based on the projected winner.

21. A method of providing an advanced choice game, the method comprising:

receiving, from each of the presentation computing devices, user profile data including user validation information;

validating the user profile data to determine user eligibility to play a proffered advanced choice game;

serving, to each validated presentation device of each eligible user, a corresponding game card having a plurality of risk units selected from a risk inventory, each risk unit having at least two potential winners and an association with a position on the game card, wherein at least one risk unit is a non-unique risk unit, which has at least two potential winners having different chances of winning;

determining a set of reward winning patterns;

for each risk unit, choosing a projected winner from the at least two potential winners therein;

determining a fixed odds payout for each of the set of reward winning patterns, based on which projected winner is selected, the fixed odds payout being based on the chances of winning and not on bets of other users;

for each risk unit, determining, based on an outcome of a set of actual events, which potential winner is an actual winner;

daubing all positions for each game card for which actual winners match projected winners;

determining if each game card has at least one reward winning pattern based on daubed positions, and identifying a user having such game card; and dispensing the fixed odds payout to the user having the reward winning pattern.

22. The method of claim 21, wherein determining the fixed odds payout includes determining the fixed odds payout based on a desired margin.

23. The method claim 22, further comprising determining the desired margin based on an estimated volume of game card sales.

24. The storage medium of claim 21 wherein determining the fixed odds payout includes determining the fixed odds payout separately for each presentation device.

25. The storage medium of claim 21, wherein determining the fixed odds payout is based on the projected winner.

* * * * *